United States Patent
Hong et al.

(10) Patent No.: US 10,736,175 B2
(45) Date of Patent: Aug. 4, 2020

(54) METHOD FOR PROCESSING DATA USING WLAN CARRIER AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/516,065

(22) PCT Filed: Oct. 1, 2015

(86) PCT No.: PCT/KR2015/010391
§ 371 (c)(1),
(2) Date: Mar. 31, 2017

(87) PCT Pub. No.: WO2016/053027
PCT Pub. Date: Apr. 7, 2016

(65) Prior Publication Data
US 2017/0311362 A1    Oct. 26, 2017

(30) Foreign Application Priority Data

Oct. 2, 2014 (KR) .......................... 10-2014-0133252
Oct. 23, 2014 (KR) .......................... 10-2014-0144476
(Continued)

(51) Int. Cl.
*H04W 76/02* (2009.01)
*H04W 84/12* (2009.01)
(Continued)

(52) U.S. Cl.
CPC ....... *H04W 84/12* (2013.01); *H04W 12/0602* (2019.01); *H04W 12/08* (2013.01);
(Continued)

(58) Field of Classification Search
CPC .......................... H04W 76/022; H04W 72/042
See application file for complete search history.

(56) References Cited

U.S. PATENT DOCUMENTS 8,824,298 B2    9/2014  Gupta et al.
8,989,762 B1 *  3/2015  Negus ................... H04W 24/02
                                                     455/454
(Continued)

FOREIGN PATENT DOCUMENTS

CN    102215530 A    10/2011
CN    105723668 A    6/2016
(Continued)

OTHER PUBLICATIONS

3GPP, "3rd Generation Partnership Project; Technical Specification Group Services and System Aspects; 3GPP system to Wireless Local Area Network (WLAN) interworking; System description (Release 12)", 3GPP TS 23.234 V12.0.0, Sep. 22, 2014.
(Continued)

*Primary Examiner* — Parth Patel
(74) *Attorney, Agent, or Firm* — IP Legal Services, LLC

(57) ABSTRACT

Provided are a method and apparatus for processing data by a terminal. The method ma include: receiving higher layer signaling including indication information requesting for configuring a terminal tunnel protocol entity for processing data transmitted/received through a WLAN carrier, configuring the terminal tunnel protocol entity on the basis of the indication information; and receiving bearer-specific user data and transmitting the bear-specific user data to a terminal user plane entity corresponding thereto.

12 Claims, 18 Drawing Sheets

US 10,736,175 B2
Page 2

(30) Foreign Application Priority Data

Sep. 4, 2015 (KR) ........................ 10-2015-0125253
Sep. 25, 2015 (KR) ........................ 10-2015-0136064

(51) Int. Cl.

| | | |
|---|---|---|
| H04W 76/12 | (2018.01) | |
| H04W 36/00 | (2009.01) | |
| H04W 12/06 | (2009.01) | |
| H04W 12/08 | (2009.01) | |
| H04W 16/10 | (2009.01) | |
| H04W 72/04 | (2009.01) | |
| H04W 76/11 | (2018.01) | |
| H04W 28/02 | (2009.01) | |
| H04W 48/16 | (2009.01) | |
| H04W 88/06 | (2009.01) | |

(52) U.S. Cl.
CPC ....... *H04W 16/10* (2013.01); *H04W 36/0085* (2018.08); *H04W 72/042* (2013.01); *H04W 76/12* (2018.02); *H04W 28/02* (2013.01); *H04W 48/16* (2013.01); *H04W 76/11* (2018.02); *H04W 88/06* (2013.01)

(56) References Cited

U.S. PATENT DOCUMENTS

| | | | |
|---|---|---|---|
| 8,995,370 B2 | 3/2015 | Pelletier et al. | |
| 9,036,473 B2 | 5/2015 | Himayat et al. | |
| 9,264,928 B2 | 2/2016 | Liu et al. | |
| 9,288,734 B2 | 3/2016 | Jha et al. | |
| 9,414,223 B2 | 8/2016 | Ginzboorg et al. | |
| 9,426,689 B2 | 8/2016 | Himayat et al. | |
| 9,510,133 B2 | 11/2016 | Gupta et al. | |
| 9,510,387 B2* | 11/2016 | Vesterinen | H04W 8/02 |
| 9,585,048 B2 | 2/2017 | Ozturk et al. | |
| 9,713,019 B2* | 7/2017 | Negus | H04W 24/02 |
| 9,722,731 B2* | 8/2017 | Ozturk | H04L 1/1628 |
| 9,730,081 B2* | 8/2017 | Chang | H04W 16/24 |
| 9,763,199 B2* | 9/2017 | Pelletier | H04W 52/146 |
| 9,860,835 B2* | 1/2018 | Cho | H04W 48/20 |
| 9,918,251 B2* | 3/2018 | Ozturk | H04W 28/085 |
| 9,924,420 B2* | 3/2018 | Peisa | H04W 36/0072 |
| 9,924,530 B2* | 3/2018 | Yang | H04W 72/1268 |
| 9,973,322 B2* | 5/2018 | Wang | H04W 28/08 |
| 10,219,310 B2* | 2/2019 | Kanugovi | H04L 12/28 |
| 2005/0181776 A1* | 8/2005 | Verma | H04W 48/16 455/418 |
| 2006/0079259 A1* | 4/2006 | Gallagher | H04W 60/04 455/517 |
| 2006/0104234 A1* | 5/2006 | Zhang | H04W 12/06 370/328 |
| 2008/0192925 A1* | 8/2008 | Sachs | H04L 12/5692 380/29 |
| 2008/0205345 A1* | 8/2008 | Sachs | H04W 36/0011 370/332 |
| 2009/0061877 A1* | 3/2009 | Gallagher | H04W 76/12 455/436 |
| 2009/0318124 A1* | 12/2009 | Haughn | G06F 8/65 455/418 |
| 2010/0182910 A1* | 7/2010 | Norefors | H04W 4/02 370/241 |
| 2011/0058531 A1* | 3/2011 | Jain | H04W 80/04 370/331 |
| 2012/0307744 A1* | 12/2012 | Charbit | H04W 72/1205 370/329 |
| 2012/0307869 A1* | 12/2012 | Charbit | H04B 1/715 375/132 |
| 2013/0028069 A1* | 1/2013 | Pelletier | H04W 72/0453 370/216 |
| 2013/0064103 A1* | 3/2013 | Koskela | H04W 72/1284 370/252 |
| 2013/0065585 A1* | 3/2013 | Pelletier | H04W 12/02 455/435.1 |
| 2013/0083653 A1 | 4/2013 | Jain et al. | |
| 2013/0083661 A1 | 4/2013 | Gupta et al. | |
| 2013/0083726 A1 | 4/2013 | Jain et al. | |
| 2013/0083783 A1 | 4/2013 | Gupta et al. | |
| 2013/0084885 A1 | 4/2013 | Jain et al. | |
| 2013/0084894 A1 | 4/2013 | Jain et al. | |
| 2013/0086653 A1* | 4/2013 | Gupta | H04W 4/70 726/5 |
| 2013/0088983 A1* | 4/2013 | Pragada | H04W 16/14 370/252 |
| 2013/0114446 A1 | 5/2013 | Liu et al. | |
| 2013/0216043 A1* | 8/2013 | Ginzboorg | H04L 63/205 380/270 |
| 2013/0242783 A1 | 9/2013 | Horn et al. | |
| 2013/0242897 A1* | 9/2013 | Meylan | H04W 28/16 370/329 |
| 2013/0242965 A1* | 9/2013 | Horn | H04W 24/10 370/338 |
| 2013/0265972 A1* | 10/2013 | Shirani-Mehr | H04W 76/27 370/329 |
| 2013/0268986 A1* | 10/2013 | Venkatachalam | H04N 21/2365 725/109 |
| 2013/0287139 A1 | 10/2013 | Zhu et al. | |
| 2013/0288686 A1 | 10/2013 | Chou | |
| 2013/0294390 A1 | 11/2013 | Yang et al. | |
| 2013/0294423 A1 | 11/2013 | Wang et al. | |
| 2014/0003270 A1 | 1/2014 | Maltsev et al. | |
| 2014/0010207 A1* | 1/2014 | Horn | H04W 36/165 370/332 |
| 2014/0018037 A1* | 1/2014 | Shanmugavadivel | H04W 48/18 455/411 |
| 2014/0036669 A1 | 2/2014 | Yang et al. | |
| 2014/0050086 A1 | 2/2014 | Himayat et al. | |
| 2014/0071925 A1* | 3/2014 | Liu | H04W 28/08 370/329 |
| 2014/0079007 A1 | 3/2014 | Li et al. | |
| 2014/0079022 A1* | 3/2014 | Wang | H04W 36/22 370/331 |
| 2014/0101726 A1 | 4/2014 | Gupta et al. | |
| 2014/0112406 A1* | 4/2014 | Zhu | H04B 7/0452 375/267 |
| 2014/0153489 A1* | 6/2014 | Perras | H04W 60/00 370/328 |
| 2014/0161004 A1 | 6/2014 | Wang et al. | |
| 2014/0177427 A1 | 6/2014 | Yiu et al. | |
| 2014/0185523 A1 | 7/2014 | Davydov et al. | |
| 2014/0219185 A1 | 8/2014 | Etemad et al. | |
| 2014/0307622 A1* | 10/2014 | Horn | H04L 45/245 370/328 |
| 2014/0348115 A1 | 11/2014 | Wang et al. | |
| 2014/0355529 A1 | 12/2014 | Zhu et al. | |
| 2014/0362704 A1* | 12/2014 | Jha | H04W 36/22 370/237 |
| 2014/0369201 A1* | 12/2014 | Gupta | H04W 4/70 370/235 |
| 2015/0016414 A1* | 1/2015 | Hwang | H04W 36/0055 370/331 |
| 2015/0029845 A1 | 1/2015 | Jain et al. | |
| 2015/0036495 A1 | 2/2015 | Venkatachalam et al. | |
| 2015/0063295 A1 | 3/2015 | Himayat et al. | |
| 2015/0092688 A1 | 4/2015 | Jeong et al. | |
| 2015/0117357 A1* | 4/2015 | Ozturk | H04W 28/0205 370/329 |
| 2015/0139079 A1 | 5/2015 | Zhu et al. | |
| 2015/0208274 A1 | 7/2015 | Himayat et al. | |
| 2015/0208286 A1* | 7/2015 | Ozturk | H04W 36/0022 370/331 |
| 2015/0215777 A1* | 7/2015 | Sirotkin | H04W 12/04 455/411 |
| 2015/0223243 A1 | 8/2015 | Tabet et al. | |
| 2015/0230225 A1 | 8/2015 | Uchino et al. | |
| 2015/0249946 A1* | 9/2015 | Oh | H04W 36/14 370/331 |
| 2015/0256303 A1* | 9/2015 | Belghoul | H04L 5/001 370/329 |

(56) References Cited

U.S. PATENT DOCUMENTS

| | | | |
|---|---|---|---|
| 2015/0257024 A1* | 9/2015 | Baid | H04W 24/10 370/338 |
| 2015/0282013 A1* | 10/2015 | Kim | H04L 65/1069 370/331 |
| 2015/0312810 A1 | 10/2015 | Yasuda et al. | |
| 2015/0327236 A1 | 11/2015 | Lin | |
| 2015/0334599 A1* | 11/2015 | Maaref | H04L 5/0041 370/236 |
| 2015/0350988 A1* | 12/2015 | Himayat | H04W 36/22 370/331 |
| 2015/0351079 A1 | 12/2015 | Himayat et al. | |
| 2015/0358884 A1* | 12/2015 | Nagasaka | H04W 48/18 370/230 |
| 2015/0373607 A1* | 12/2015 | Zhu | H04W 36/22 370/331 |
| 2016/0021581 A1* | 1/2016 | Deenoo | H04W 48/16 370/331 |
| 2016/0057660 A1 | 2/2016 | Hong et al. | |
| 2016/0066234 A1 | 3/2016 | Cho et al. | |
| 2016/0073265 A1* | 3/2016 | Vutukuri | H04W 12/06 455/411 |
| 2016/0112896 A1* | 4/2016 | Karampatsis | H04W 28/0252 370/230.1 |
| 2016/0165508 A1* | 6/2016 | Jin | H04W 36/14 370/331 |
| 2016/0192252 A1* | 6/2016 | Dai | H04W 36/0094 370/331 |
| 2016/0227504 A1 | 8/2016 | Etemad et al. | |
| 2016/0285716 A1* | 9/2016 | Pelletier | H04L 5/0098 |
| 2016/0302135 A1 | 10/2016 | Yang et al. | |
| 2016/0323027 A1 | 11/2016 | Zhu et al. | |
| 2016/0323790 A1* | 11/2016 | Wang | H04W 28/08 |
| 2016/0323798 A1 | 11/2016 | Horn et al. | |
| 2016/0330669 A1* | 11/2016 | Li | H04W 16/14 |
| 2016/0337781 A1 | 11/2016 | Jain et al. | |
| 2017/0013565 A1* | 1/2017 | Pelletier | H04W 52/146 |
| 2017/0048914 A1* | 2/2017 | Zeng | H04W 28/08 |
| 2017/0055313 A1* | 2/2017 | Sharma | H04W 76/15 |
| 2017/0070923 A1* | 3/2017 | Li | H04W 36/0066 |
| 2017/0078914 A1* | 3/2017 | Fujishiro | H04W 28/04 |
| 2017/0094701 A1* | 3/2017 | Hong | H04W 76/022 |
| 2017/0134123 A1* | 5/2017 | Ozturk | H04L 1/1628 |
| 2017/0142691 A1* | 5/2017 | Sirotkin | H04W 72/042 |
| 2017/0201920 A1* | 7/2017 | Shi | H04W 36/14 |
| 2017/0222746 A1* | 8/2017 | Kang | H04J 3/0667 |
| 2017/0257265 A1* | 9/2017 | Hong | H04L 41/0803 |
| 2017/0264606 A1* | 9/2017 | Forssell | H04L 63/0815 |
| 2017/0290021 A1* | 10/2017 | Choi | H04W 28/0278 |
| 2017/0318580 A1* | 11/2017 | Park | H04W 72/0446 |
| 2018/0020500 A1* | 1/2018 | Pelletier | H04W 76/046 |
| 2018/0092146 A1* | 3/2018 | Hong | H04W 48/16 |
| 2018/0098265 A1* | 4/2018 | Tomici | H04W 8/18 |
| 2018/0132135 A1 | 5/2018 | Shi et al. | |

FOREIGN PATENT DOCUMENTS

| | | |
|---|---|---|
| JP | 2014-096664 A | 5/2014 |
| WO | 2012/148482 A1 | 11/2012 |
| WO | 2014/157888 A1 | 10/2014 |
| WO | 2014/168426 A1 | 10/2014 |

OTHER PUBLICATIONS

Intel Corporation, "Stage-2 details of WLAN/3GPP Radio Interworking for LTE", R2-143177, 3GPP TSG-RAN WG2 Meeting #87, Dresden, Germany, Aug. 18-Aug. 22, 2014, pp. 1-2.

Sony, "Ue capabilities for WLAN Interworking", R2-143162, 3GPP TSG-RAN WG2 Meeting #87, Dresden, Germany, Aug. 18-22, 2014, pp. 1-3.

Samsung, "AS/NAS modelling for WLAN/3GPP radio interworking", R2-142214, 3GPP TSG-RAN2 Meeting #86, Seoul, Korea, May 19-23, 2014, pp. 1-3.

Intel Corporation, "New SI Proposal: LTE-WLAN Radio Level Integration", RP-141276, 3GPP TSG RAN Meeting #65, Edinburgh, Scotland, Sep. 9-12, 2014, pp. 1-6.

3GPP, "LTE; Evolved Universal Terrestrial Radio Access (E-UTRA); Radio Resource Control (RRC); Protocol specification (3GPP TS 36.331 version 12.3.0 Release 12)", ETSI TS 136 331 V12.3.0, Sep. 2014.

* cited by examiner

FIG.12

| Octets | Bits | | | | | | | |
|---|---|---|---|---|---|---|---|---|
| | 8 | 7 | 6 | 5 | 4 | 3 | 2 | 1 |
| 1 | Version | | | PT | Spare | E | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet) | | | | | | | |
| 10 | Sequence Number (2nd Octet) | | | | | | | |
| 11 | N-PDU Number | | | | | | | |
| 12 | Next Extension Header Type | | | | | | | |

FIG.16

*AS-Config information element*

```
-- ASN1START

AS-Config ::=                            SEQUENCE {
    sourceMeasConfig                         MeasConfig,
    sourceRadioResourceConfig                RadioResourceConfigDedicated,
    sourceSecurityAlgorithmConfig            SecurityAlgorithmConfig,
    sourceUE-Identity                        C-RNTI,
    sourceMasterInformationBlock             MasterInformationBlock,
    sourceSystemInformationBlockType1        SystemInformationBlockType1(WITH COMPONENTS
                                                 {..., nonCriticalExtension ABSENT}),
    sourceSystemInformationBlockType2        SystemInformationBlockType2,
    antennaInfoCommon                        AntennaInfoCommon,
    sourceDl-CarrierFreq                     ARFCN-ValueEUTRA,
    ...
    [[ sourceSystemInformationBlockType1Ext  OCTET STRING (CONTAINING
                                                 SystemInformationBlockType1-v890-IEs)   OPTIONAL,
       sourceOtherConfig-r9                  OtherConfig-r9
       -- sourceOtherConfig-r9 should have been optional. A target eNB compliant with this transfer
       -- syntax should support receiving an AS-Config not including this extension addition group
       -- e.g. from a legacy source eNB
    ]],
    [[ sourceSCellConfigList-r10             SCellToAddModList-r10                       OPTIONAL
    ]]
}

AS-Config-v9e0 ::=                       SEQUENCE {
    sourceDl-CarrierFreq-v9e0                ARFCN-ValueEUTRA-v9e0
}

AS-Config-v12xy ::=                      SEQUENCE {
    sourceWlan-OffloadConfig-r12             WLAN-OffloadConfig-r12                      OPTIONAL
}

-- ASN1STOP
```

METHOD FOR PROCESSING DATA USING WLAN CARRIER AND APPARATUS THEREFOR

CROSS REFERENCE TO RELATED APPLICATIONS

This application is a National Stage Patent Application of PCT International Patent Application No. PCT/KR2015/010391 (filed on Oct. 1, 2015) under 35 U.S.C. § 371, which claims priority to Korean Patent Application Nos. 10-2014-0133252 (filed on Oct. 2, 2014), 10-2014-0144476 (filed on Oct. 23, 2014), 10-2015-0125253 (filed on Sep. 4, 2015), and 10-2015-0136064 (filed on Sep. 25, 2015), the teachings of which are incorporated herein in their entireties by reference.

TECHNICAL FIELD

The present disclosure relates to a method and an apparatus for processing user plane data by adding a Wireless Location Area Network (WLAN) to an Evolved Universal mobile telecommunication system Terrestrial Radio Access Network (E-UTRAN) carrier in a RAN level. More particularly, the present disclosure relates to a detailed method for transmitting or receiving specific user plane data between an evolved NodeB (eNB) and a User Equipment (UE) through a WLAN. Further, the present disclosure relates to a method and an apparatus for a control plane procedure to transmit or receive specific user plane data between an eNB and a UE through a WLAN carrier.

BACKGROUND ART

As communication systems have developed, various wireless UEs have been introduced to consumers, such as companies and individuals. A current mobile communication system has been affiliated with $3^{rd}$ generation partnership project (3GPP), for example, Long Term Evolution (LTE), LTE-Advanced (LTE-A), and the like. The current mobile communication system may be a high-speed and high-capacity communication system capable of transmitting and receiving various types of data, such as image data, wireless data, and the like, at a high speed. Accordingly, there is a desire for developing a technology to transmit a large amount data at a high-speed as fast as transmission in a wired communication network. Data may be efficiently transmitted using a plurality of cells to transmit a large amount of data in a high speed.

However, the eNB has a limitation in providing high speed and capacity data service to a plurality of UEs because of limited frequency resources. That is, a particular service provider should pay a high cost to secure frequency resources for exclusive use.

Meanwhile, non-licensed frequency bands cannot be exclusively used by a particular service provider or a particular communication system. Such non-licensed frequency bands may be shared between a plurality of service providers or communication systems. For example, WLAN technology represented by Wi-Fi provides a data transmission/reception service through frequency resources of non-licensed frequency bands.

Accordingly, there is a demand for developing a technology for transmitting/receiving data to/from a UE through a corresponding Wi-Fi AP (Access Point) in a mobile communication system.

DETAILED DESCRIPTION OF THE INVENTION

Technical Problem

The present disclosure made under such a background provides a method and an apparatus for transmitting and receiving data by forming a tunnel structure based on a WLAN carrier by an eNB and a UE.

When the UE transmits particular user plane data or a particular radio bearer, the present disclosure provides a method and an apparatus for transmitting or receiving user plane data units separately or linkedly through an E-UTRAN carrier and/or the WLAN carrier on E-UTRAN layer 2.

The present disclosure provides a detailed method and an apparatus for providing a control plane procedure to transmit and receive data included in a particular bearer through the WLAN carrier.

The present disclosure provides a method and an apparatus for securing efficient mobility by effectively controlling the WLAN carrier according to a movement of the UE even when the UE moves.

Technical Solution

The present disclosure to solve the technical problem provides a method of processing data by a UE. The method includes receiving higher layer signaling including indication information that makes a request for setting a UE tunnel protocol entity for processing bearer-specific user data transmitted and received through a WLAN carrier; configuring the UE tunnel protocol entity based on the indication information; and receiving the bearer-specific user data and transferring the bearer-specific user data to a UE user plane entity.

The method of processing data by the eNB includes transmitting higher layer signaling including indication information that makes a request for setting a UE tunnel protocol entity for processing bearer-specific user data transmitted and received through a WLAN carrier to a UE, configuring an eNB tunnel protocol entity corresponding to the UE tunnel protocol entity, and adding a downlink tunnel endpoint ID to the bearer-specific user data and transmitting the bearer-specific user data.

The present disclosure provides a UE for processing data. The UE includes: a receiver configured to receive higher layer signaling including indication information that makes a request for setting a UE tunnel protocol entity for processing bearer-specific user data transmitted and received through a WLAN carrier; and a controller configured to configure the UE tunnel protocol entity based on the indication information, receive the bearer-specific user data, and transfer the bearer-specific user data to a UE user plane entity.

The present disclosure provides an eNB for processing data. The eNB includes a transmitter configured to transmit higher layer signaling including indication information that makes a request for setting a UE tunnel protocol entity for processing bearer-specific user data transmitted and received through a WLAN carrier to a UE; and a controller configured to configure an eNB tunnel protocol entity corresponding to the UE tunnel protocol entity, wherein the transmitter adds a downlink tunnel endpoint ID to the bearer-specific user data and transmits the bearer-specific user data.

The present disclosure provides a method of transmitting and receiving data by a UE. The method includes: receiving WLAN radio resource configuration-dedicated information for setting data transmission and reception using a WLAN carrier from an eNB; setting a radio bearer group including one or more radio bearers to transmit and receive data through the WLAN carrier based on the WLAN radio resource configuration-dedicated information, and transmitting and receiving the data of the radio bearer group through the WLAN carrier. The present disclosure provides a method in which the WLAN radio resource configuration-dedicated information includes at least one of a WLAN ID, encryption algorithm information, and key information. The present disclosure provides a method in which the WLAN radio resource configuration-dedicated information corresponds to information configured to be distinguished from radio resource configuration-dedicated information of a radio bearer transmitting and receiving data through an eNB carrier. The present disclosure provides a method in which, when a handover of the UE is determined, WLAN measurement information and the WLAN radio resource configuration-dedicated information are transmitted to a target eNB. The present disclosure provides a method in which the WLAN radio resource configuration-dedicated information transmitted to the target eNB is transmitted while being inserted into a handover request message. The present disclosure provides a method in which the target eNB releases WLAN radio resource configuration and transmits and receives data of the radio bearer group through the eNB carrier.

The present disclosure provides a method of transmitting and receiving data by an eNB. The method includes: generating WLAN radio resource configuration-dedicated information for setting data transmission and reception using a WLAN carrier; transmitting the WLAN radio resource configuration-dedicated information to a UE; and transmitting and receiving data of a radio bearer group including one or more radio bearers through the WLAN carrier, wherein the WLAN radio resource configuration-dedicated information includes information for setting the radio bearer group to transmit and receive the data through the WLAN carrier. The present disclosure provides a method in which the WLAN radio resource configuration-dedicated information includes at least one of a WLAN ID, encryption algorithm information, and key information. The present disclosure provides a method in which the WLAN radio resource configuration-dedicated information corresponds to information configured to be distinguished from radio resource configuration-dedicated information of a radio bearer transmitting and receiving data through an eNB carrier. The present disclosure provides a method that further includes determining a handover of the UE and in which, when the handover of the UE is determined, WLAN measurement information and the WLAN radio resource configuration-dedicated information are transmitted to a target eNB. The present disclosure provides a method in which the WLAN radio resource configuration-dedicated information transmitted to the target eNB is transmitted while being inserted into a handover request message. The present disclosure provides a method in which the target eNB releases WLAN radio resource configuration and transmits and receives data of the radio bearer group through the eNB carrier.

The present disclosure provides a UE for transmitting and receiving data. The UE includes: a receiver configured to receive WLAN radio resource configuration-dedicated information for setting data transmission and reception using a WLAN carrier from an eNB; a controller configured to set a radio bearer group including one or more radio bearers to transmit and receive data through the WLAN carrier based on the WLAN radio resource configuration-dedicated information, and a transmitter configured to transmit the data of the radio bearer group through the WLAN carrier. The present disclosure provides a UE in which the WLAN radio resource configuration-dedicated information includes at least one of a WLAN ID, encryption algorithm information, and key information. The present disclosure provides ae UE in which the WLAN radio resource configuration-dedicated information corresponds to information configured to be distinguished from radio resource configuration-dedicated information of a radio bearer transmitting and receiving data through an eNB carrier. The present disclosure provides a UE in which, when a handover of the UE is determined, WLAN measurement information and the WLAN radio resource configuration-dedicated information are transmitted to a target eNB. The present disclosure provides a UE in which the WLAN radio resource configuration-dedicated information transmitted to the target eNB is transmitted while being inserted into a handover request message. The present disclosure provides a UE in which the target eNB releases WLAN radio resource configuration and transmits and receives data of the radio bearer group through the eNB carrier.

The present disclosure provides an eNB for transmitting and receiving data. The eNB includes: a controller configured to generate WLAN radio resource configuration-dedicated information for setting data transmission and reception using a WLAN carrier; a transmitter configured to transmit the WLAN radio resource configuration-dedicated information to a UE; and a receiver configured to receive data of a radio bearer group including one or more radio bearers through the WLAN carrier, wherein the WLAN radio resource configuration-dedicated information includes information for setting the radio bearer group to transmit and receive the data through the WLAN carrier. The present disclosure provides the eNB in which the WLAN radio resource configuration-dedicated information includes at least one of a WLAN ID, encryption algorithm information, and key information. The present disclosure provides the eNB in which the WLAN radio resource configuration-dedicated information corresponds to information configured to be distinguished from radio resource configuration-dedicated information of a radio bearer transmitting and receiving data through an eNB carrier. The present disclosure provides an eNB in which, when a handover of the UE is determined, the transmitter transmits WLAN measurement information and the WLAN radio resource configuration-dedicated information to a target eNB. The present disclosure provides the eNB characterized that the WLAN radio resource configuration-dedicated information transmitted to the target eNB is transmitted while being inserted into a handover request message. The present disclosure provides an eNB in which the target eNB releases WLAN radio resource configuration and transmits and receives data of the radio bearer group through the eNB carrier.

Effects of the Invention

In accordance with at least one embodiment, data may be effectively transmitted and received as the eNB and the UE configure a tunnel structure through the WLAN carrier.

Further, in accordance with at least one embodiment, user plane data units may be effectively transmitted and received separately or linkedly through the E-UTRAN carrier and/or the WLAN carrier on E-UTRAN layer 2 when the UE transmits particular user plane data or a particular radio bearer.

In addition, in accordance with at least one embodiment, control plane configuration information for transmitting and receiving data included in a particular bearer may be effectively provided through the WLAN carrier.

Moreover, in accordance with at least one embodiment, data may be seamlessly transmitted and received through the WLAN carrier when the UE moves.

BRIEF DESCRIPTION OF THE DRAWINGS

FIG. 12 illustrates an exemplary GTP-U (GPRS Tunneling Protocol-User Plane) header;

FIG. 16 illustrates an exemplary AS-Config IE (Information Element) according to the related art;

BEST MODE FOR CARRYING OUT THE INVENTION

Figure 1:
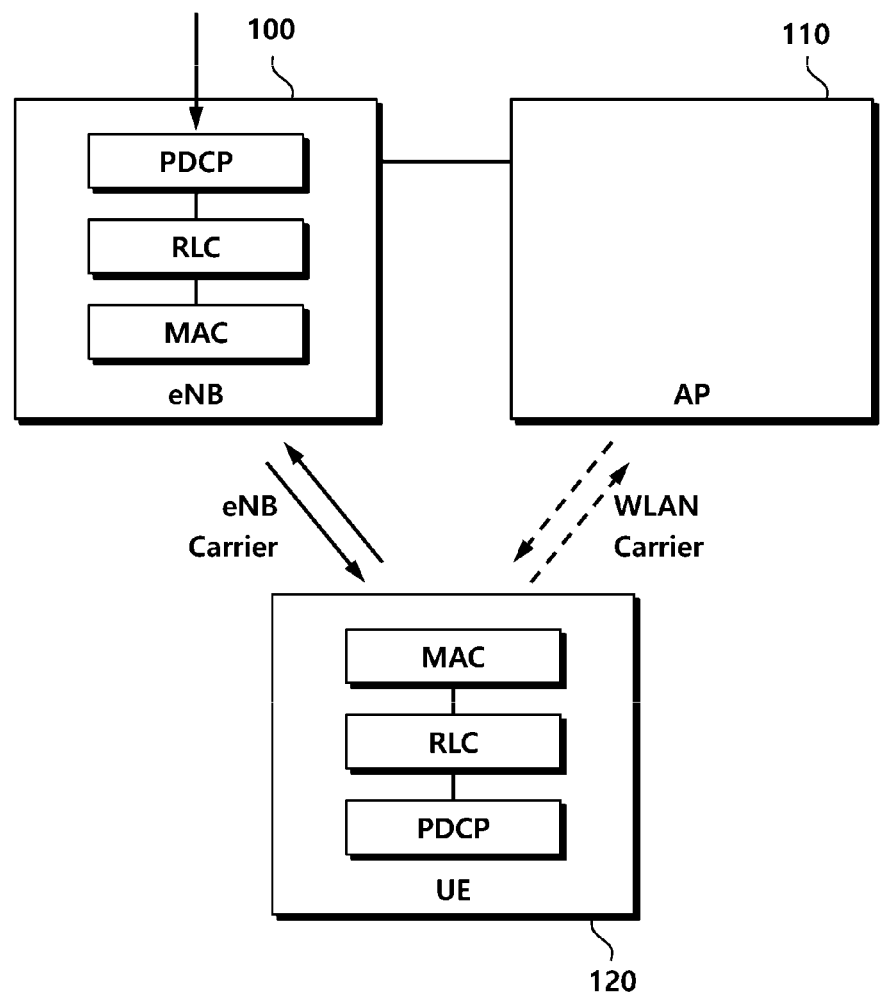
FIG. 1 illustrates an exemplary data transmission path using an E-UTRAN carrier and a WLAN carrier.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release 12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above-mentioned various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), a base station may indicate all devices that interact with one another to enable the devices that provide a predetermined wireless area to be controlled by an identical entity or to cooperatively configure the wireless area. Based on a configuration type of a wireless area, an eNB, an RRH, an antenna, an RU, a Low Power Node (LPN), a point, a transmission/reception point, a transmission point, a reception point, and the like may be embodiments of a base station. In ii), a base station may indicate a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. However, the user equipment and the base station may not be limited to a predetermined term or word. In the specification, the user equipment and the base station are used as two (uplink or downlink) inclusive transceiving subjects to embody the technology and technical concepts described in the specifications. However, the user equipment and the base station may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, signal transmission and signal reception through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. An eNB may transmit a Physical Downlink Shared Channel (PDSCH) which is a primary physical channel for unicast transmission, and the eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The typical 3GPP Release 12 has discussed the 3GPP/WLAN interworking technology. The 3GPP/WLAN interworking technology provides a RAN assisted WLAN interworking function. The E-UTRAN may help UEs in an RRC_IDLE state and an RRC_CONNECTED state in UE-based di-directional traffic steering between the E-UTRAN and the WLAN.

The E-UTRAN provides an assistance parameter to the UE through broadcast signaling or dedicated RRC signaling. RAN assistance parameters may include at least one of an E-UTRAN signal strength threshold, a WLAN channel use threshold, a WLAN backhaul data transmission rate threshold, a WLAN signal strength, and an offload preference indicator. Further, the E-UTRAN may provide a list of WLAN identifiers to the UE through broadcast signaling.

The UE uses RAN assistance parameters to evaluate access network selection and traffic steering rules. When the access network selection and traffic steering rules are fulfilled, the UE indicates it in an AS (access stratum) higher layer.

When applying the access network selection and traffic steering rules, the UE performs traffic steering between the E-UTRAN and the WLAN in the unit of APNs (granularity). As described above, the RAN assisted WLAN interworking function provides a method in which the E-UTRAN and the WLAN are constructed and linked to stand alone.

However, the interworking function has a problem in that the eNB cannot more tightly control radio resources in consideration of a radio state or mobility of the UE since the E-UTRAN and the WLAN are constructed and linked to stand alone. Accordingly, the need for a technology considering a tighter combination in the RAN level compared to the Release 12 RAN assisted WLAN interworking function has increased. That is, when transmitting particular user plane data, the UE could not simultaneously use the E-UTRAN carrier and the WLAN carrier through the addition of the WLAN carrier as one carrier within the E-UTRAN in the RAN level by the E-UTRAN in consideration of a radio state and mobility of the UE. The WLAN carrier refers to radio resources of the WLAN and may include a WLAN radio link, WLAN radio, WLAN radio resources, or a WLAN radio network. However, hereinafter, for convenience of understanding, the WLAN radio link, WLAN radio, WLAN radio resources, or WLAN radio network will be described as the WLAN carrier.

Further, when the E-UTRAN adds the WLAN carrier as one carrier within the E-UTRAN in the RAN level and transmits user plane data through the E-UTRAN carrier and/or the WLAN carrier, user plane data units could not be separated (for example, split or routed) or linked on E-UTRAN layer 2 in the unit of radio bearers according to user plane data characteristics.

As described above, when the E-UTRAN adds the WLAN carrier as one carrier in the RAN level and transmits the user plane data through the E-UTRAN carrier and the WLAN carrier, the user could not transmit/receive user plane data units separately or linkedly according to each radio bearer divided into a particular user plane data characteristic in the related art.

An aspect of the present disclosure made to solve the above problem is to provide a method of, when the UE transmit particular user plane data or a particular radio bearer, transmitting or receiving user plane data units separately or linkedly through the E-UTRAN carrier and/or the WLAN carrier on E-UTRAN layer 2.

The present disclosure may be provided in a scenario where the eNB and a WLAN termination are non-co-located. In the scenario where the eNB and the WLAN termination are non-co-located, the eNB and the WLAN termination may be established through a non-ideal backhaul, a near-ideal backhaul, or an ideal backhaul. Alternatively, the present disclosure may be provided in a scenario where the eNB and a WLAN termination are co-located. The WLAN termination in this specification refers to a logical WLAN network node. For example, the WLAN termination may be a WLAN AP or a WLAN AC. The WLAN termination may be a WLAN network node such as the typical WLAN AP or the typical WLAN AC, or a WLAN network node including an additional function for WLAN integrated transmission to the typical WLAN AP or the typical WLAN AC. The WLAN termination may be implemented as an independent entity or as a functional entity included in another entity. Hereinafter, the following description will be made based on an assumption that the WLAN termination is the WLAN AP or an AP in this specification.

To add the WLAN carrier to the UE as one carrier within the E-UTRAN at the RAN level by the E-UTRAN and to transmit and receive user plane data through the E-UTRAN carrier and the WLAN carrier, it may be necessary to provide a protocol structure therefor and an operation of each layer.

The addition of the WLAN carrier as one carrier by the E-UTRAN conceptually means that the UE and the eNB add a function for the WLAN carrier to the typical E-UTRAN cell.

To add the WLAN carrier to the UE as one carrier within the E-UTRAN in the RAN level by the E-UTRAN and to transmit user plane data in the unit of radio bearers through the E-UTRAN carrier and/or the WLAN carrier, user plane data units may be separated (split or routed) or linked on a sublayer of E-UTRAN layer 2, and the user plane data may be transmitted.

For example, data to be transmitted through the E-UTRAN carrier and data to be transmitted through the WLAM carrier may be separately transmitted by a PDCP higher entity, and the data may be received (or integratedly received) by a peered PDCP higher entity. Alternatively, the PDCP higher entity may linkedly transmit the data, which is to be transmitted through the WLAN carrier, and the peered higher PDCP entity may receive the data. In another example, data to be transmitted through the E-UTRAN carrier and data to be transmitted through the WLAM carrier may be separately transmitted by a PDCP entity, and the data may be received (or integratedly received) by a peered PDCP entity. Alternatively, the PDCP entity may linkedly transmit data, which is to be transmitted through the WLAN carrier, and the peered PDCP entity may receive the data. In another example, data to be transmitted through the E-UTRAN carrier and data to be transmitted through the WLAM carrier may be separately transmitted by an RLC entity, and the data may be received (or integratedly received) by a peered RLC entity. Alternatively, the RLC entity may transmit data, which is to be linkedly transmitted through the WLAN carrier, and the peered RLC entity may receive the data.

<Data Transmission Path>

Hereinafter, embodiments will be described within a scenario where an E-UTRAN adds a WLAN carrier to a UE as one carrier within the E-UTRAN and transmits and receives user plane data in a unit of radio bearers through the E-UTRAN carrier and/or the WLAN carrier, with reference to the drawings. That is, an uplink and downlink data transmission path scenario will be described when the PDCP layer transmits user data by separating or linking i) first data to be transmitted through the E-UTRAN carrier and/or ii) second data to be transmitted through the WLAN carrier. Hereinafter, although it is described, as an example, for convenience and ease of understanding that the separation or link is performed on the PDCP layer, the separation or link may be similarly performed on layers other than the PDCP layer (for example, a PDCP higher layer, an RLC layer, or a layer included in a PDCP lower layer and an RLC higher layer) because only the subject of the entity is changed to another layer (for example, the RLC) from the PDCP. Accordingly, a method of performing separation or link on the E-UTRAN layer as well as the PDCP may be included in the scope of the present disclosure.

FIG. 1 illustrates an exemplary data transmission path using an E-UTRAN carrier and a WLAN carrier.

Referring to FIG. 1, an eNB 100 may transmit and receive uplink and downlink data to and from a UE 120 through an eNB carrier. Further, a WLAN AP 110 may also transmit and receive uplink and downlink data to and from the UE 120 through the WLAN carrier. That is, both the eNB carrier and the WLAN carrier may process the uplink and downlink data.

Figure 2:
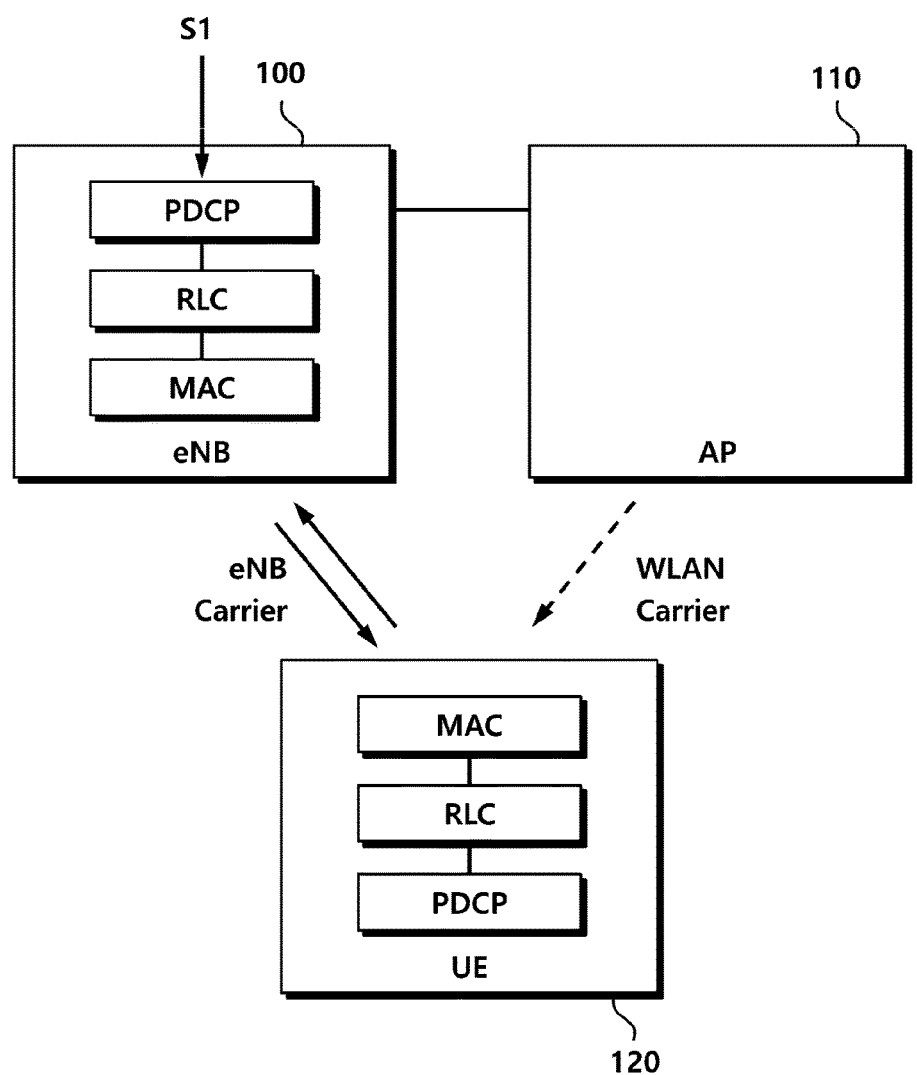
FIG. 2 illustrates another exemplary data transmission path using the E-UTRAN carrier and the WLAN carrier.

FIG. 2 illustrates another exemplary data transmission path using the E-UTRAN carrier and the WLAN carrier.

Referring to FIG. 2, the eNB 100 may transmit and receive uplink and downlink data to and from the UE 120 through the eNB carrier. In contrast, the WLAN AP 110 may transmit only the downlink data to the UE 120 through the WLAN carrier. That is, the eNB carrier and the WLAN carrier can be simultaneously used for downlink, but only the eNB carrier can be used for uplink.

Figure 3:
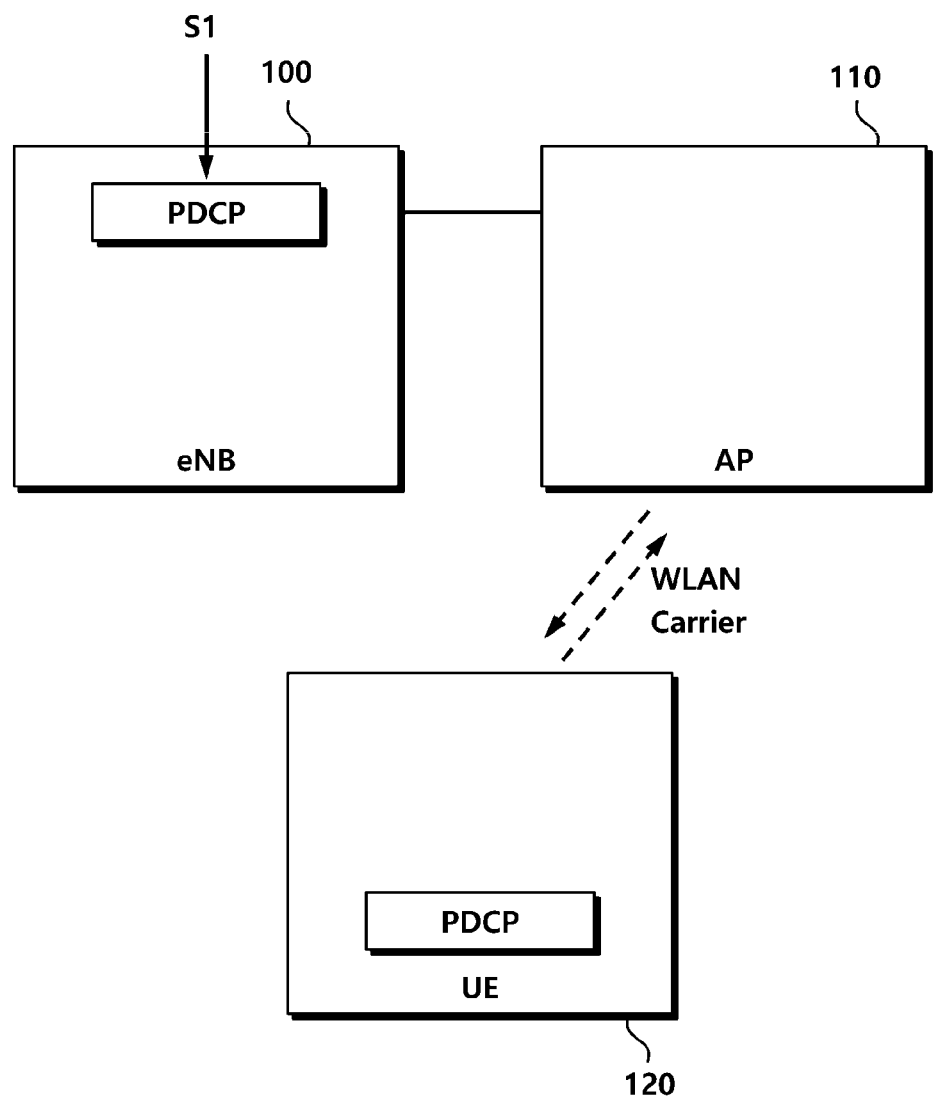
FIG. 3 illustrates still another exemplary data transmission path using the E-UTRAN carrier and the WLAN carrier.

FIG. 3 illustrates still another exemplary data transmission path using the E-UTRAN carrier and the WLAN carrier.

Referring to FIG. 3, both the uplink and downlink data may be processed through the WLAN carrier. That is, the eNB 100 and the WLAN AP 110 may transmit and receive the downlink and uplink data to and from the UE 120 through the WLAN carrier.

Figure 4:
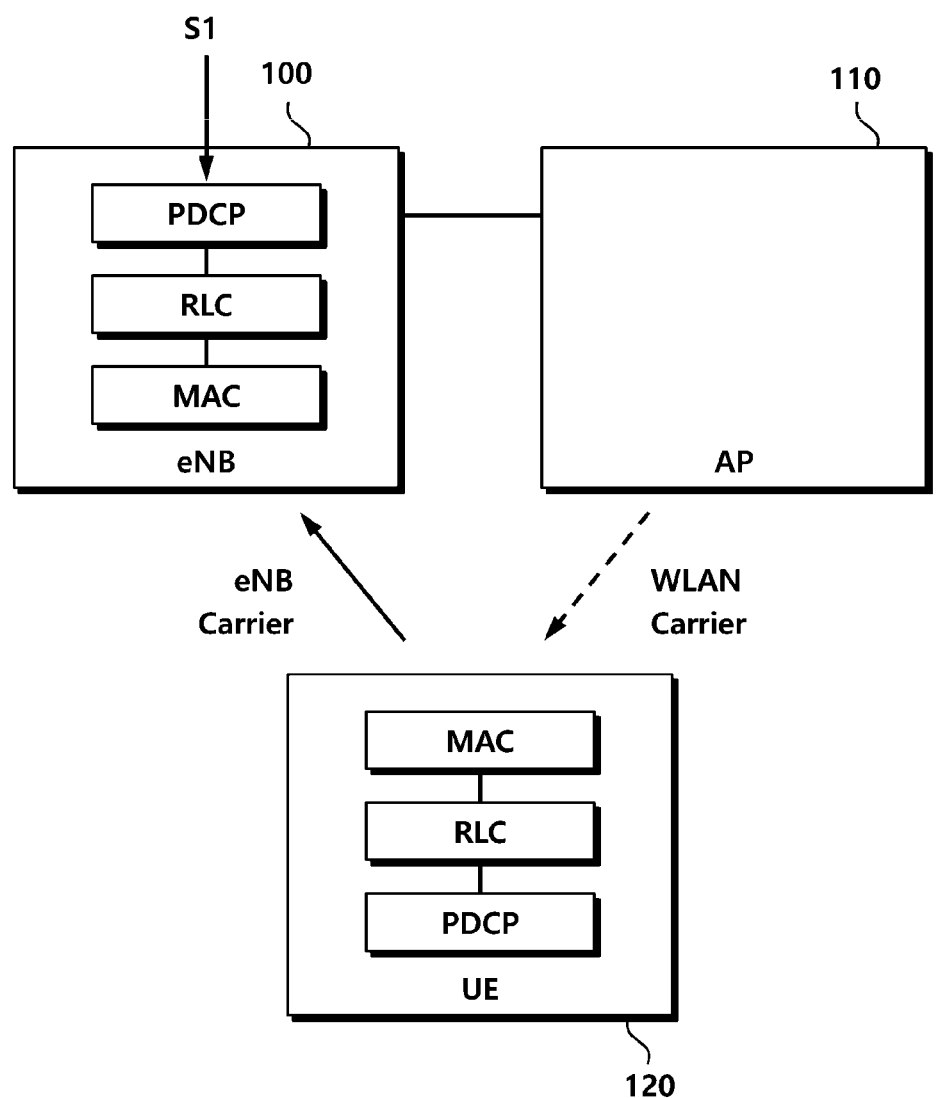
FIG. 4 illustrates yet another exemplary data transmission path using the E-UTRAN carrier and the WLAN carrier.

FIG. 4 illustrates yet another exemplary data transmission path using the E-UTRAN carrier and the WLAN carrier.

Referring to FIG. 4, the eNB 100 may receive uplink data from the UE 120 through the eNB carrier. Further downlink data may be transmitted via the WLAN AP 110 through the WLAN carrier. That is, the eNB carrier may process the uplink transmission and the WLAN carrier may process the downlink transmission.

In FIG. 1 or FIG. 3, a method may be needed for enabling the eNB 100 to transmit user data to the UE 120 via the WLAN AP 110 for downlink and for enabling the UE 120 to transmit user data to the eNB 100 via the WLAN AP 110 for uplink.

Meanwhile, in FIG. 2 or FIG. 4, a method may be needed for enabling the eNB 100 to transmit user data to the UE 120 via the WLAN AP 110 for downlink.

The eNB carrier refers to the E-UTRAN carrier and is formed through E-UTRAN radio resources.

<Data Transmission through Tunneling>

Hereinafter, a method of transmitting user data through tunneling according to the present disclosure will be described in detail.

Figure 5:
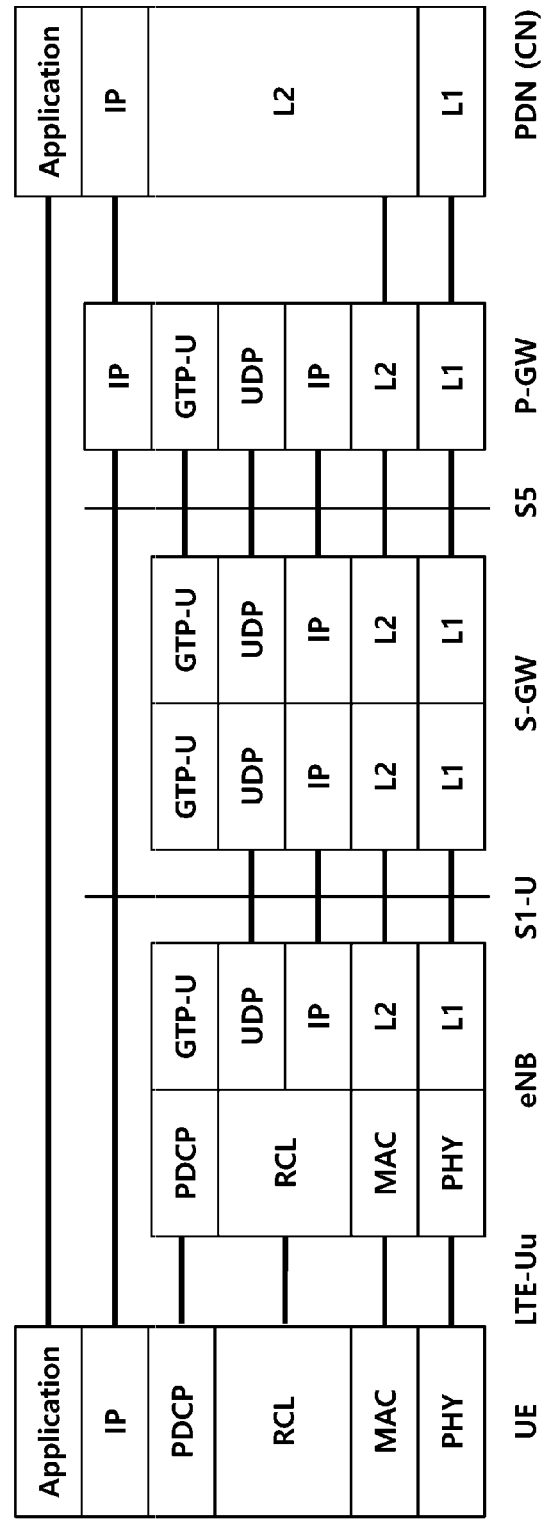
FIG. 5 illustrates a user plane protocol structure in an EPS (Evolved Packet System)

FIG. 5 illustrates a user plane protocol structure in an EPS (Evolved Packet System).

As illustrated in FIG. 5, user data (or IP packets), which the UE transmits to the eNB through the E-UTRAN carrier in the typical LTE network, is transmitted through an S1 GTP tunnel between the eNB and an S-GW and an S5 GTP tunnel between the S-GW and a P-GW. That is, between two nodes on the LTE network (for example, between the eNB and an MME, the eNB and the SGW, the MME and the SGW, or the SGW and the PGW), control data or user data is transmitted by a GTP-U tunnel through a GTP-based interface. User plane data belonging to a particular radio bearer may be distinguished and transmitted using an E-UTRAN layer 2 protocol without the GTP tunnel between the UE and the eNB. With respect to downlink user plane data received from the S-GW, the eNB may be aware of a UE and a radio bearer of the UE to which the corresponding data is transmitted through a Tunnel Endpoint Identifier (TEID) of the S1 GTP tunnel on a GTP header, and, with respect to uplink user plane data received from the UE, the eNB may be aware of an S1 GTP tunnel to which the corresponding data is transmitted according to each UE or each radio bearer.

In the present disclosure, the eNB may set up, construct, or configure a tunnel between the UE and the eNB by adding the WLAN carrier to the UE to transmit user plane data between the UE and the eNB through the WLAN AP. The tunnel between the UE and the eNB may refer to a WLAN linked tunnel or a predetermined tunnel based on header encapsulation for transmission through the WLAN. For example, a predetermined tunnel adding a UDP/IP/user plane protocol header to the user plane data, a GTP tunnel, a GRE tunnel, an IP in IP tunnel, or an IPSEC tunnel may be set up. Hereinafter, the following description is made based on an assumption that the tunnel between the UE and the eNB is the GTP tunnel. This is only for convenience and ease of the description, and the use of the predetermined tunnel based on the header encapsulation is included in the scope of the present disclosure.

Encapsulate and Transmit E-UTRAN Layer 2 User Data

Figure 6:
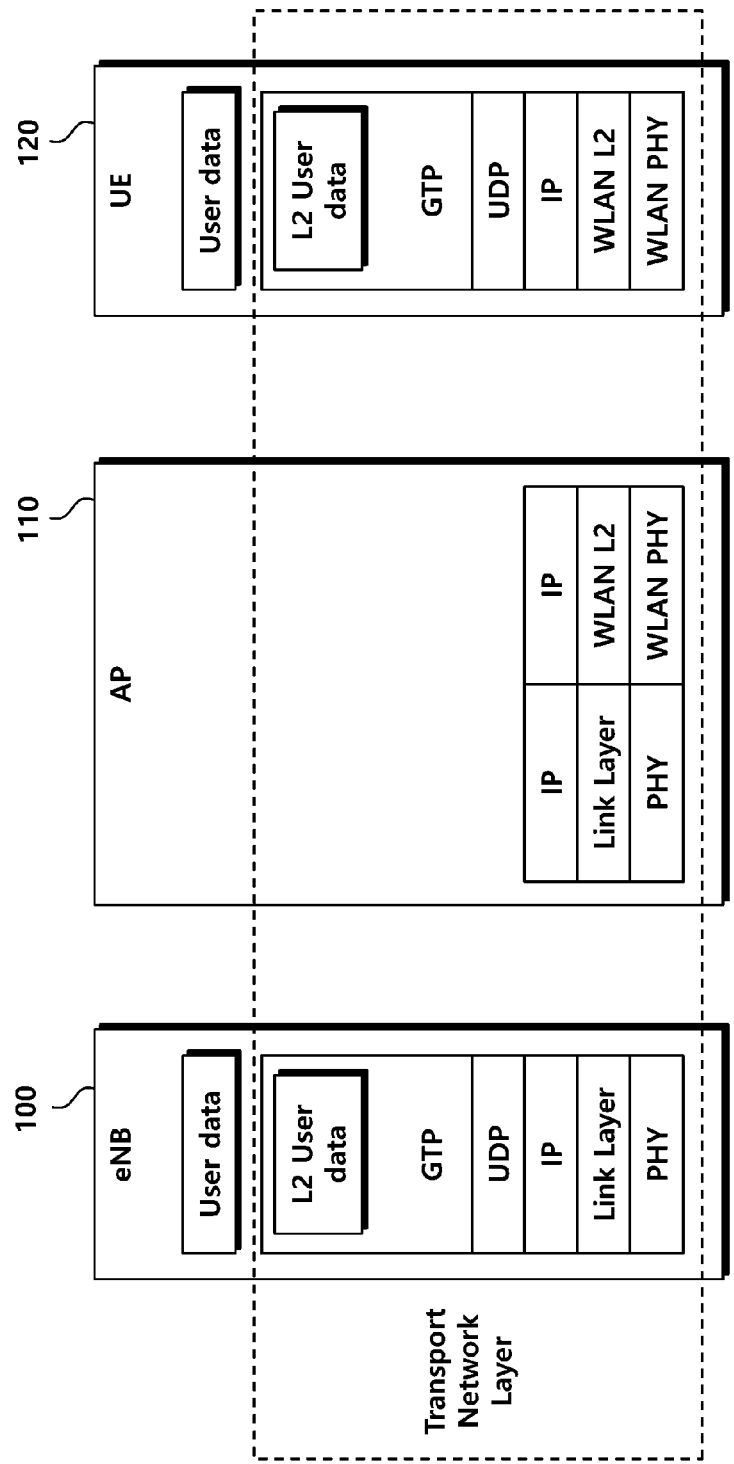
FIG. 6 illustrates an exemplary user plane protocol structure according to the present disclosure.
Figure 7:
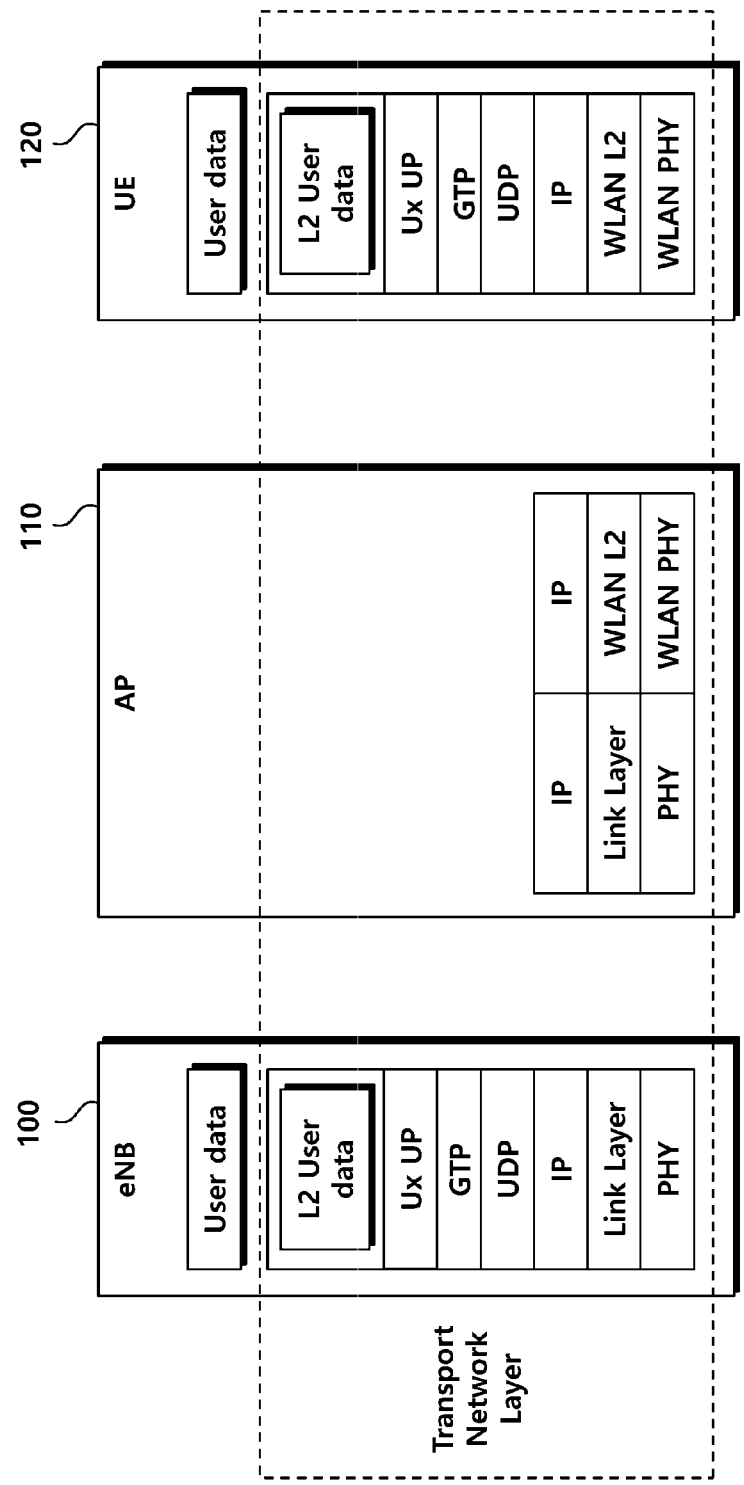
FIG. 7 illustrates another exemplary user plane protocol structure according to the present disclosure.

FIG. 6 illustrates an exemplary user plane protocol structure according to the present disclosure. FIG. 7 illustrates another exemplary user plane protocol structure according to the present disclosure.

Referring to FIG. 6 and FIG. 7, the WLAN AP 110 performs routing on an IP layer. However, the routing/switching or MAC switching of the WLAN AP 110 on a data link layer is included in the scope of the present disclosure.

As illustrated in FIG. 6 and FIG. 7, GTP tunnels may be set up in the eNB 100 and the UE 120. For example, when the downlink transmission is performed through the WLAN carrier like in scenarios of FIG. 1 to FIG. 4, the eNB 100 may transport user data, which is to be transmitted separately or linkedly through the WLAN carrier, by using the downlink tunnel through the GTP tunnel protocol. In another example, when the uplink transmission is performed through the WLAN carrier as illustrated in FIG. 1 to FIG. 3, the UE 120 may transport user data, which is to be transmitted separately or linkedly through the WLAN carrier, by using the uplink tunnel through the GTP tunnel protocol.

The tunnel (for example, the GTP tunnel or the predetermined tunnel based on the header encapsulation) between the eNB 100 and the UE 120 may be used for transporting encapsulated user data packets (e.g., IP packets, E-UTRAN layer 2 SDU/PDU or E-UTRAN layer 2 user data, or Ux UP SDU/PDU) between a pair of given tunnel endpoints.

For example, when the PDCP layer or the PDCP entity separates or link i) first data to be transmitted through the E-UTRAN carrier and/or ii) second data to be transmitted through the WLAN carrier, the tunnel between the eNB 100 and the UE 120 may be used for transporting PDCP SDUs/PDUs (or Ux UP SDUs/PDUs) between a pair of given tunnel endpoints.

In another example, when the RLC layer or the RLC entity separates or link i) the first data to be transmitted through the E-UTRAN carrier and/or ii) the second data to be transmitted through the WLAN carrier, the tunnel between the eNB 100 and the UE 120 may be used for transporting RLC PDUs (or Ux UP SDUs/PDUs) between a pair of given tunnel endpoints.

The tunnel protocol header (for example, a GTP header or a header on the predetermined tunnel based on the header encapsulation) of the tunnel between the eNB 100 and the UE 120 includes a tunnel endpoint identifier (for example, TEID) field. This field unambiguously identifies tunnel endpoints within a receiving tunnel protocol entity. The tunnel protocol entity may refer to a GTP-U protocol entity, a GTP protocol entity, a linked entity, a linked protocol entity, a GTP tunnel entity, a GTP-U tunnel entity, a GTP entity, a GTP-U entity, an interworking entity, an aggregation entity, an integrated protocol entity, or a transport protocol entity.

The tunnel endpoint included within the tunnel protocol header may indicate a tunnel to which a particular user data packet (an IP packet, an E-UTRAN layer 2 SDU/PDU, E-UTRAN layer 2 user data, or a Ux UP SDU/PDU) belongs. Alternatively, the tunnel endpoint included within the tunnel protocol header may indicate to distinguish radio bearers to which the particular user data packet belongs or radio bearer entities (the PDCP entity, the RLC entity, or the Ux UP entity). Alternatively, the tunnel endpoint included within the tunnel protocol header may map the particular user data packet to the corresponding radio bearer or the corresponding radio bearer entity.

The tunnel endpoint identifier (TEID) included in the tunnel protocol header may be transmitted to the corresponding user plane radio bearer entity through the demultiplexing of incoming traffic.

For example, when the eNB PDCP entity separately or linkedly transmits i) the first data to be transmitted through the E-UTRAN carrier and/or ii) the second data to be transmitted through the WLAN carrier, the UE receiving the data through the downlink tunnel may transfer/present PDCP SDUs/PDUs to the PDCP entity within the peered or corresponding UE based on tunnel endpoint ID.

In another example, based on an assumption that a higher user plane entity of the eNB PDCP entity or a lower user plane entity of the PDCP entity is a Ux UP entity, when the Ux UP entity separately or linkedly transmits the data to be transmitted through the E-UTRAN carrier and/or the data to be transmitted through the WLAN carrier, the UE receiving the data through the downlink tunnel may transfer/present Ux UP SDUs/PDUs to the Ux UP entity within the peered or corresponding UE based on tunnel endpoint ID.

In still another example, when the eNB RLC entity separately or linkedly transmits i) the data to be transmitted through the E-UTRAN carrier and/or ii) the data to be transmitted through the WLAN carrier, the UE receiving the data through the downlink tunnel may transfer/present RLC PDUs to the RLC entity within the peered or corresponding UE based on tunnel endpoint ID.

To perform the data transmission service and the data reception service through the tunnel between the eNB and the UE, the tunnel protocol entity may be provided to the eNB and the UE.

For example, the tunnel protocol entity may be configured to be associated with one radio bearer in each direction. That is, the tunnel protocol entity may identify and receive data through one tunnel endpoint ID. For example, the UE may identify data included in a particular radio bearer through the downlink tunnel endpoint ID and transfer the data to a radio bearer entity. In another example, the UE may insert the uplink tunnel endpoint ID into the data included in the particular radio bearer and transmit the data.

In another example, the tunnel protocol entity may be configured to be associated with one or more radio bearers. At this time, through one or more tunnel endpoints, data traffic included in corresponding radio bearers may be identified and received. The tunnel protocol entity may identify corresponding radio bearers through one or more tunnel endpoints and transmit traffic. The tunnel protocol entity may receive traffic mapped to layer 2 entities of one or more radio bearers and transfer traffic to layer 2 entities of peered radio bearers or layer 2 entities of radio bearers corresponding to the peered radio bearers through the tunnel endpoint ID.

In the tunnel between the eNB and the UE, a UDP destination port number may use the same value. For example, a port number 2152 registered for GTP-U may be used.

In a case of the downlink tunnel, user data packets may be encapsulated with a GTP header (or tunnel protocol header or IPSEC header), a UDP header (or TCP header), and an IP header by the transmission tunnel protocol entity of the eNB.

When an outer IP packet generated as a result is larger than an MTU (Maximum Transmission Unit) of a first link to a destination endpoint, fragmentation of the IP packet may be performed. In the case of the downlink tunnel, when predetermined IP fragmentation is performed, the reception tunnel protocol entity of the UE may reassemble the IP packets. The received IP packets or the reassembled IP packets are transferred (passed) to IP/UDP/GTP layers and user data packets (IP packet, E-UTRAN layer 2 SDU/PDU, or E-UTRAN layer 2 user data, PDCP SDUs/PDUs, RLC PDUs, or Ux UP SDUs/PDUs) are extracted. The extracted user data packets are transferred to a corresponding radio bearer (layer 2) entity.

According to the present disclosure, an interface connected between the eNB and the UE through the WLAN carrier is defined and described as a Ux interface. A Ux UP protocol (or a Ux user plane protocol or a protocol for controlling transmission of E-UTRAN radio network user plane data, hereinafter referred to as a Ux UP protocol) for providing control information may be provided for a delivery of PDCP SDUs/PDUs or acknowledgement of a successful delivery of the PDCP SDUs/PDUs on the Ux interface. That is, when the Ux UP protocol exists on a PDCP lower layer, the control information for providing the delivery of the PDCP SDUs/PDUs or the acknowledgement of the successful delivery of the PDCP SDUs/PDUs on the Ux interface may be transferred.

The Ux UP protocol may be located on a user plane of a radio network layer on an interface connected between the eNB and the UE through the WLAN carrier. Alternatively, the Ux UP protocol may be located on a layer 2 user plane on the interface (Ux) connected between the eNB and the UE through the WLAN carrier. Alternatively, the Ux UP protocol may be located on a PDCP layer user plane on the interface (Ux) connected between the eNB and the UE through the WLAN carrier. Alternatively, the Ux UP protocol may be located on an RLC layer user plane on the interface (Ux) connected between the eNB and the UE through the WLAN carrier. Alternatively, the Ux UP protocol may be located on a higher layer user plane of the PDCP on the interface (Ux) connected between the eNB and the UE through the WLAN carrier. Alternatively, the Ux UP protocol may be located on a lower layer user plane of the PDCP on the interface (Ux) connected between the eNB and the UE through the WLAN carrier. Alternatively, the Ux UP protocol may be located on a user plane between the PDCP and the RLC layer on the interface (Ux) connected between the eNB and the UE through the WLAN carrier. Each Ux UP protocol entity may be associated with only one radio bearer (for example, data radio bearer/S1 bearer/EPS bearer). Alternatively, each Ux UP protocol entity may be associated with only one E-RAB. The Ux UP protocol entity in this specification may be described as a Ux protocol instance, a Ux linked entity, a Ux linked instance, a linked entity, a linked protocol entity, an interworking entity, an aggregation entity, or a transport protocol entity. However, for convenience for describing and ease of understanding, the Ux UP protocol entity is used and described in this specification.

When the Ux UP protocol entity is constructed, the Ux UP protocol entity may be constructed in the eNB and the UE where the radio bearer is set up/added/configured on the Ux interface. For example, the eNB may insert Ux UP protocol configuration information for setting the Ux UP protocol entity into radio bearer configuration information (DRB-ToAddMod) configured to be radio bearer-specific (or according to each radio bearer) and transfer the radio bearer configuration information through an RRC reconfiguration message.

For example, as illustrated in FIG. 7, Ux UP protocol data or Ux UP SDU(s)/PDU(s) may be included in the GTP-U protocol. For example, as illustrated in FIG. 7, Ux UP protocol data or Ux UP SDU(s)/PDU(s) may be included in the GTP-U protocol header. Alternatively, as illustrated in FIG. 7, the Ux UP protocol data or the Ux UP SDU(s)/PDU(s) may be included in a GTP-U extension header. Alternatively, as illustrated in FIG. 7, the Ux UP protocol data or the Ux UP SDU(s)/PDU(s) may be included in a field (or a container) defined for the Ux UP protocol within the GTP-U extension header. In this case, the Ux UP protocol may be used only for transporting control information for providing indication/acknowledgement for a successful delivery of PDCP SDUs/PDUs on the Ux interface, and the PDCP SDUs/PDUs may be included in a GTP-U payload and transferred as illustrated in FIG. 6.

In another example, as illustrated in FIG. 7, the Ux UP protocol data or the Ux UP PDU(s) may be included in the GTP-U payload. Alternatively, as illustrated in FIG. 7, the Ux UP protocol data may be encapsulated with the attachment of the GTP-U header. Alternatively, as illustrated in FIG. 7, the Ux UP protocol (or Ux UP entity) may be encapsulated with the attachment of the Ux UP header to the PDCP SDUs/PDUs. In this case, the Ux UP protocol may be used for transferring/transporting the control information for providing the delivery/transport of the PDCP SDUs/PDUs and/or the indication/acknowledgement for the successful delivery of the PDCP PDUs on the Ux interface.

In another example, as illustrated in FIG. 7, the Ux UP protocol data or the Ux UP PDU(s) may be included in the GTP-U payload. Alternatively, as illustrated in FIG. 7, the Ux UP protocol data may be encapsulated with the attachment of the GTP-U header. Alternatively, as illustrated in FIG. 7, the Ux UP protocol (or Ux UP entity) may be encapsulated with the attachment of the Ux UP header to the PDCP SDUs/PDUs. In this case, the Ux UP entity may be an entity for identifying PDCP SDUs (IP packets).

The Ux UP protocol may provide a sequence number for user data (or PDCP SDUs/PDUs) transmitted from the eNB to the UE through the WLAN. Alternatively, the Ux UP protocol may provide a sequence number for user data (or PDCP SDUs/PDUs) transmitted from the UE to the eNB through the WLAN carrier. Alternatively, the Ux UP protocol may provide a sequence number for the control information for providing the indication/acknowledgement for the successful delivery of the user data (or PDCP SDUs/PDUs) transmitted from the eNB to the UE through the WLAN carrier. Alternatively, the Ux UP protocol may provide a sequence number for the control information for providing the indication/acknowledgement for the successful delivery of the user data (or PDCP PDUs) transmitted from the UE to the eNB through the WLAN carrier.

Figure 8:
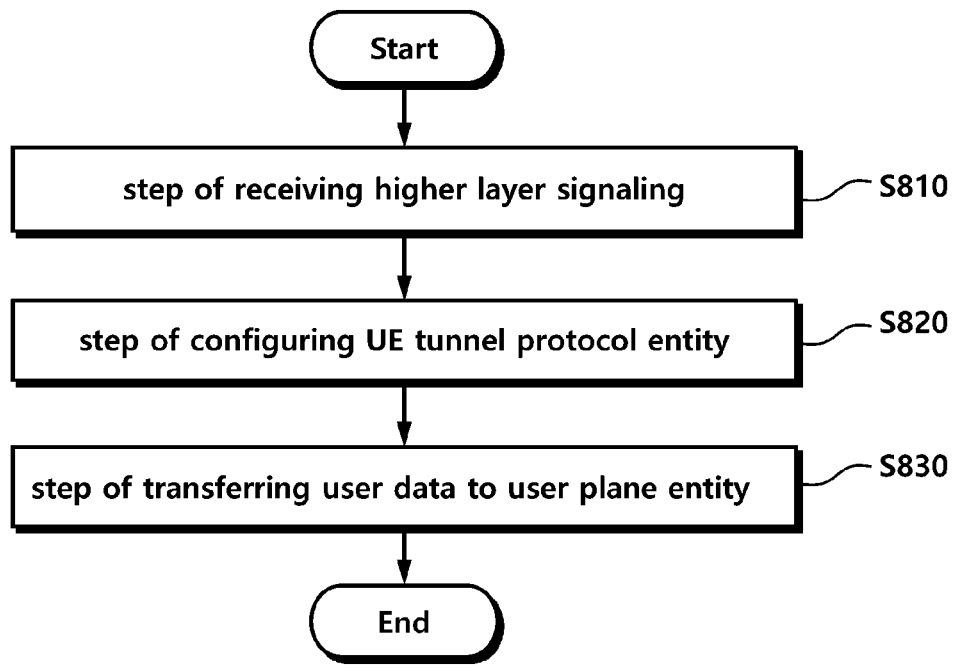
FIG. 8 illustrates operations of an UE according to an embodiment of the present disclosure.

FIG. 8 illustrates operations of a UE according to an embodiment of the present disclosure.

A method of processing data by a UE according to an embodiment of the present disclosure may include receiving higher layer signaling including indication information that makes a request for setting a UE tunnel protocol entity for processing bearer-specific user data transmitted and received through a WLAN carrier, configuring the UE tunnel protocol entity based on the indication information, and receiving the bearer-specific user data and transferring the bearer-specific user data to a UE user plane entity.

Referring to FIG. 8, the UE may perform an operation of receiving higher layer signaling including indication information that makes a request for setting a UE tunnel protocol entity for processing data transmitted and received through a WLAN carrier in S810. The UE is required to configure the tunnel protocol entity to transmit data to and receive data from the eNB through the tunnel. Accordingly, the UE may receive the indication information that makes the request for setting the UE tunnel protocol entity included in the higher layer signaling from the eNB. For example, the higher layer signaling including the indication information may be an RRC reconfiguration message. The UE tunnel protocol entity serves to process data separately or linkedly transmitted and received through the WLAN carrier. As described above, the UE tunnel protocol entity may transfer the data separately or linkedly received through the WLAN carrier to a peered entity within the UE. Alternatively, the UE tunnel protocol entity may perform an operation for separately or linkedly transferring data to the eNB through the WLAN carrier.

Further, the UE may perform an operation of configuring the UE tunnel protocol entity based on the indication information in S820. The UE may configure the UE tunnel protocol entity within the UE based on the indication information received through the higher layer signaling. For example, the UE may configure the UE tunnel protocol entity through a downlink tunnel endpoint ID included in radio bearer configuration information of the higher layer signaling.

Further, the UE may perform an operation of receiving bearer-specific user data and transferring the bearer-specific user data to a corresponding UE user plane entity in S830. The bearer-specific user data received by the UE may refer to downlink user data and may include the downlink tunnel endpoint ID. Accordingly, the UE may identify the downlink tunnel endpoint ID included in the bearer-specific user data and process the received data according to each radio bearer.

Through the operation, the UE may receive and process data separated or linked using the WLAN carrier and transmit the data through the WLAN carrier.

Figure 9:
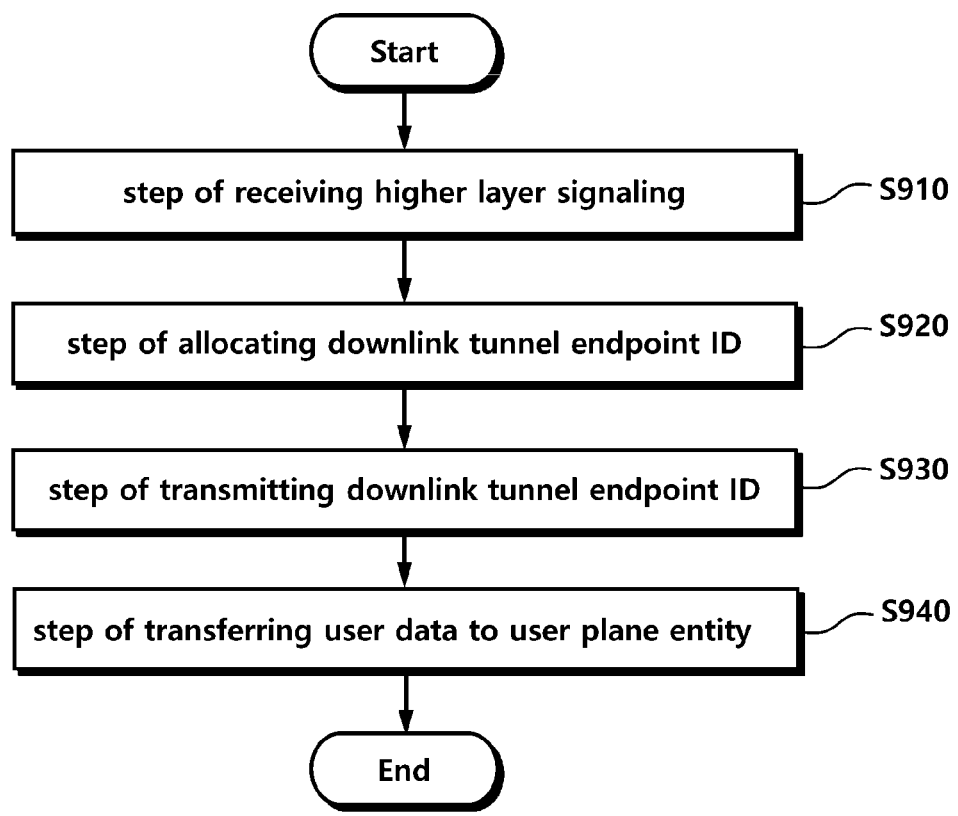
FIG. 9 illustrates operations of UE according to another embodiment of the present disclosure.

FIG. 9 illustrates operations of a UE according to another embodiment of the present disclosure.

Referring to FIG. 9, the UE according to the present disclosure may perform an operation of receiving indication information for setting a UE tunnel protocol entity in S910. Further, the UE may allocate a radio bearer-specific downlink tunnel endpoint ID according to the indication information in S920. The UE may inform the eNB of the allocated radio bearer-specific downlink tunnel endpoint ID in S930. Thereafter, the UE may perform an operation of receiving bearer-specific downlink user data and transferring the bearer-specific downlink user data to a corresponding UE user plane entity in S940.

Further, the downlink data may include a downlink tunnel endpoint ID. That is, the UE may receive downlink data including the downlink tunnel endpoint ID and transfer the corresponding downlink data to a layer 2 entity within the corresponding UE based on the tunnel endpoint ID.

Meanwhile, when transmitting uplink data, the UE may receive higher layer signaling including radio bearer configuration information of a radio bearer configured to transfer uplink data through the WLAN carrier. In this case, the radio bearer configuration information may include at least one of transport layer address information of the eNB, a UDP port number, and an uplink tunnel endpoint ID of the eNB. For example, the uplink tunnel endpoint ID refers to a tunnel endpoint ID of the eNB tunnel protocol entity configured in the eNB. The UE may insert the uplink tunnel endpoint ID into uplink data and transmit the uplink data.

Hereinafter, operation of an eNB corresponding to the UE operation shown in FIG. 8 and FIG. 9 will be described.

Figure 10:
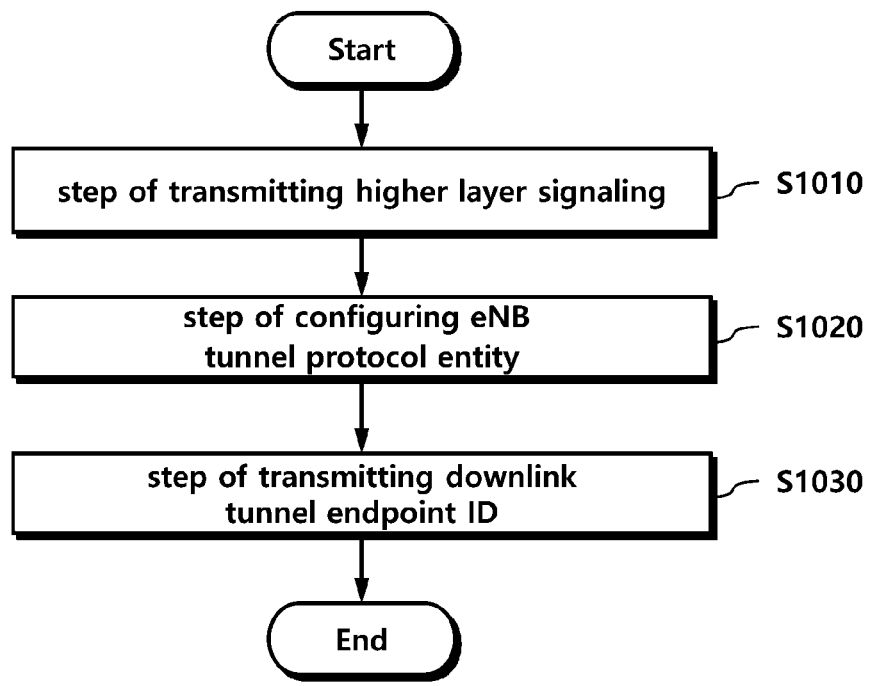
FIG. 10 illustrates operations of an eNB according to an embodiment of the present disclosure.

FIG. 10 illustrates operations of an eNB according to an embodiment of the present disclosure.

A method of processing data by an eNB may include transmitting higher layer signaling including indication information that makes a request for setting a UE tunnel protocol entity for processing bearer-specific user data transmitted and received through a WLAN carrier to a UE, configuring an eNB tunnel protocol entity corresponding to the UE tunnel protocol entity, and adding a downlink tunnel endpoint ID to the bearer-specific user data and transmitting the bearer-specific user data.

Referring to FIG. 10, the eNB may perform an operation of transmitting higher layer signaling including indication information that makes a request for setting a UE tunnel protocol entity for processing data transmitted and received through a WLAN carrier to the UE in S1010. As described above, the eNB may generate and transmit the indication information of the UE tunnel protocol entity to separately or linkedly transmit and receive data through the WLAN carrier to the UE. The UE configures the UE tunnel protocol entity within the UE based on the received indication information.

Further, the eNB may perform an operation of configuring an eNB tunnel protocol entity corresponding to the UE tunnel protocol entity in S1020. The eNB may configure the eNB tunnel protocol entity corresponding to the UE tunnel protocol entity to transmit and receive data through the WLAN carrier. The operation of configuring the eNB tunnel protocol entity corresponding to the UE tunnel protocol entity may be performed before the operation of transmitting the higher layer signaling including the indication information that makes the request for setting the UE tunnel protocol entity for processing the data transmitted and received through the WLAN carrier to the UE. In this case, the eNB may allocate a downlink tunnel endpoint ID to be used for reception by the UE and/or an uplink tunnel endpoint ID to be used for transmission by the UE.

Further, the eNB may perform an operation of adding the downlink tunnel endpoint ID to bear-specific user data and transmitting the bear-specific user data in S1030. When transmitting downlink data, the eNB may insert and transmit the corresponding downlink tunnel endpoint ID.

Figure 11:
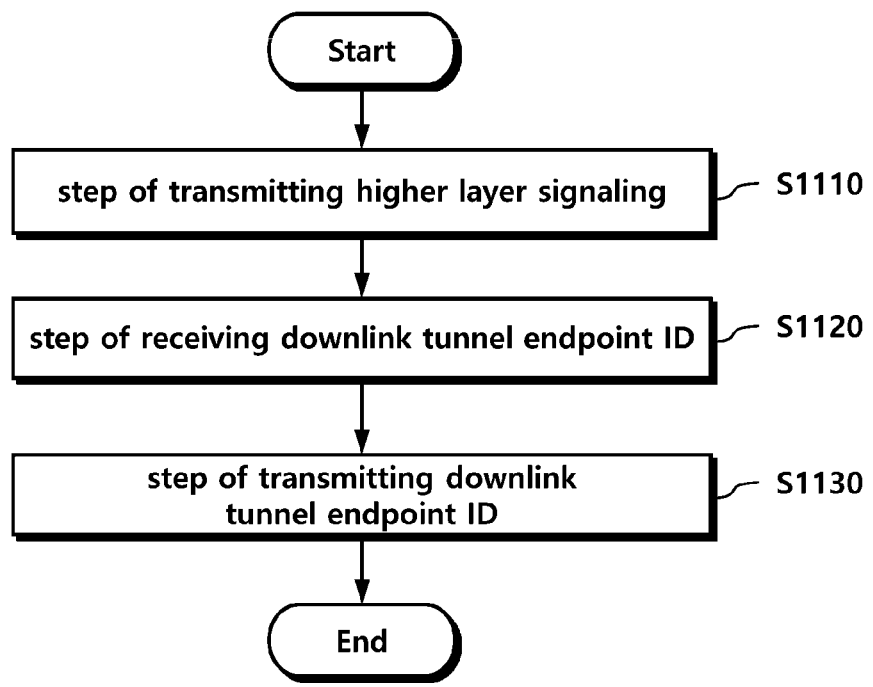
FIG. 11 illustrates operations of an eNB according to another embodiment of the present disclosure.

FIG. 11 illustrates operations of an eNB according to still another embodiment of the present disclosure.

Referring to FIG. 11, the operations performed in S1110 and S1130 are the same as operations performed in S1010 and S1030 described above. Meanwhile, the eNB may further include an operation of receiving the downlink tunnel endpoint ID at step S1120, between the steps S1110 and S1130. The UE may allocate a radio bearer-specific downlink tunnel endpoint ID according to the indication information included in the higher layer signaling. Further, the UE may inform the eNB of the allocated radio bearer-specific tunnel endpoint ID. In addition, the eNB may insert the downlink tunnel endpoint ID into downlink data transmitted to the UE through the WLAN carrier and transmit the downlink data.

Alternatively, radio bearer configuration information included in higher layer signaling may include at least one of transport layer address information of the eNB, a UDP port number, and an uplink tunnel endpoint ID of the eNB. The UE may transmit uplink data through the corresponding radio bearer based on the radio bearer configuration information including the uplink tunnel endpoint ID. In this case, the UE may insert the uplink tunnel endpoint ID into the uplink data and transmit the uplink data.

According to the above description, in accordance with at least one embodiment, data may be effectively transmitted as the eNB and the UE configure a tunnel structure through the WLAN carrier. Further, in accordance with at least one embodiment of the present disclosure, user plane data units may be transmitted and received separately or linkedly through the E-UTRAN carrier and/or the WLAN carrier on E-UTRAN layer 2 when the UE transmits particular user plane data or a particular radio bearer.

Hereinafter, the embodiments of transmitting and receiving data through the tunnel configuration described with reference to FIG. 8 to FIG. 11 will be described in more detail based on division of uplink and downlink.

Downlink Tunnel Configuration

The eNB may insert information for instructing the UE to set up or establish the downlink UE tunnel protocol entity into an RRC reconfiguration message and transmit the RRC reconfiguration message to the UE.

When the downlink UE tunnel protocol entity is set up/established in the UE, the eNB may insert information for instructing the UE to release the setup of the downlink UE tunnel protocol entity into an RRC reconfiguration message and transmit the RRC reconfiguration message to the UE.

Hereinafter, a case of the downlink will be described, and the UE tunnel protocol entity is described as a downlink tunnel protocol entity.

First, for example, a configuration in which the eNB generates/allocates a radio bearer-specific downlink tunnel ID will be described.

The eNB may insert information (for example, at least one of a downlink tunnel endpoint ID, a bear ID such as an IP address, and a UE ID) for instructing the UE to set up or establish the UE tunnel protocol entity into an RRC reconfiguration message and transmit the RRC reconfiguration message to the UE. The UE may receive the RRC message (for example, an RRC connection reconfiguration message, a UE information request message, a typical RRC message, or a new RRC message) including the information for instructing the UE to set up/establish the downlink tunnel protocol entity from the eNB. The UE may transmit a higher layer message including acknowledgement of the setup of the downlink tunnel to the eNB. For example, the acknowledgement of the setup of the downlink tunnel may be transmitted through an RRC connection complete message. In another example, the acknowledgement of the setup of the downlink tunnel may be transmitted through an RRC message (for example, a UE information response message, a UE assistance message, a typical RRC message, or a new RRC message (referred to as a WLAN status message for convenience of the description)) distinguished from the RRC connection complete message after the RRC connection complete message.

That is, the eNB may set up the downlink tunnel and transmit user data (e.g., IP packets, PDCP SDUs/PDUs, or RLC PDUs) included in a particular radio bearer to the UE separately or linkedly through the WLAN carrier. In this case, the eNB may insert information for transferring/instructing the UE to map/distinguish the user data (e.g., IP packets, PDCP SDUs/PDUs, or RLC PDUs) received by the UE to a corresponding layer 2 entity (e.g., a Ux UP entity, a PDCP entity, or an RLC entity) into the RRC reconfiguration message and transmit the RRC reconfiguration message to the UE. The eNB may insert the tunnel endpoint ID into radio bearer configuration information (e.g., DRB- ToAddMod) configured to be radio bearer-specific (or configured according to each radio bearer) to transfer the user data (e.g., IP packets, PDCP SDUs/PDUs, RLC PDUs, or Ux UP SDU/PDU) included in the particular radio bearer received by the UE separately or linkedly through the WLAN carrier to the corresponding layer 2 entity (e.g., PDCP entity, RLC entity, or Ux UP entity). The UE having received the tunnel endpoint ID and having configured the downlink tunnel protocol entity may distinguishably transfer/present user data (e.g., PDCP PDUs, RLC PDUs, or Ux UP PDU) received later through the configured downlink tunnel protocol entity to a corresponding layer 2 entity (e.g., PDCP entity or RLC entity).

In another example, generation and allocation of the radio bearer-specific downlink tunnel ID will be described. The UE may receive an RRC message (for example, RRC connection reconfiguration message, UE information request message, typical RRC message, or new RRC message) including information for instructing the UE to set up/establish the downlink tunnel protocol entity or information that makes a request for information required for set up/establishing the downlink tunnel protocol entity (for example, downlink tunnel endpoint ID, bearer ID such as IP address, UE ID, WLAN association status information, WLAN measurement information) from the eNB. For example, the new RRC message may be a WLAN status request message. However, the WLAN status request message is only for an example for the description and is not limited thereto. Further, the new RRC message has no limitation on the name and function thereof. In this case, the UE may locally allocate the tunnel endpoint ID of the downlink tunnel and transfer the tunnel endpoint ID to the eNB through a higher layer message (for example, RRC connection reconfiguration complete, UE information response message, UE assistance message, typical RRC message, or WLAN status message).

The UE may receive an RRC message (for example, RRC connection reconfiguration message, UE information request message, typical RRC message, or WLAN status request message) including information for instructing the UE to set up/establish the downlink tunnel protocol entity or information that makes a request for information required for set up/establishing the downlink tunnel protocol entity (for example, downlink tunnel endpoint ID, UE ID such as IP address, bearer ID, WLAN association status information, WLAN measurement information) from the eNB. In this case, the UE may locally allocate the tunnel endpoint ID of the downlink tunnel and transfer the tunnel endpoint ID to the eNB through a higher layer message (for example, RRC connection reconfiguration complete, UE information response message, UE assistance message, typical RRC message, or WLAN status message).

Thereafter, the eNB may transmit the RRC message (for example, the RRC connection reconfiguration message) including the information for instructing to receive data through the downlink tunnel protocol entity.

The UE may receive an RRC message (for example, RRC connection reconfiguration message, UE information request message, convention RRC message, or new RRC message) including information for instructing the UE to set up/establish the downlink tunnel protocol entity or information that makes a request for information required for set up/establishing the downlink tunnel protocol entity (for example, downlink tunnel endpoint ID, bearer ID such as IP address, UE ID, WLAN association status information, WLAN measurement information) from the eNB. In this case, the UE locally allocates the tunnel endpoint ID of the downlink tunnel and/or attempts access to the WLAN (WLAN association) and/or allocates an IP address through the WLAN and/or establishes security between the UE and the eNB through the WLAN. Further, the UE may transfer relevant information to the eNB through a higher layer message (for example, the RRC connection reconfiguration complete, the UE information response message, the UE assistance message, the typical RRC message, or the WALN status message). Thereafter, the eNB may transmit the RRC message (for example, the RRC connection reconfiguration message) including information for instructing to receive data through the downlink tunnel protocol entity.

Uplink Tunnel Configuration

The eNB may insert information for instructing the UE to set up/establish the uplink UE tunnel protocol entity into an RRC reconfiguration message and transmit the RRC reconfiguration message to the UE.

When the uplink UE tunnel protocol entity is set up/established in the UE, the eNB may insert information for instructing the UE to release the setup of the uplink UE tunnel protocol entity into an RRC reconfiguration message and transmit the RRC reconfiguration message to the UE in consideration of WLAN radio quality of the UE and eNB radio resources.

Hereinafter, a case of the uplink will be described, and the UE tunnel protocol entity is described an uplink tunnel protocol entity. The downlink tunnel protocol entity and the uplink tunnel protocol entity are individually configured or may be configured in the UE tunnel protocol entity.

The eNB may insert information for instructing the UE to set up the uplink tunnel and transmit user data (e.g., IP packets, PDCP SDUs/PDUs, RLC PDUs/or Ux UP SDUs/PDUs) included in a particular radio bearer to the eNB separately or linkedly through the WLAN carrier into an RRC message (for example, an RRC connection reconfiguration message) and transmit the RRC message.

For example, radio bearer configuration information (e.g., DRB-ToAddMod) configured to be radio bearer-specific (or configured according to each radio bearer) may include at least one of a transport layer address (or an IP address) of the eNB, a UDP port number, a tunnel endpoint ID of the eNB, and a tunnel security parameter. Alternatively, when the UDP port number having a specifically designated value is used, the UDP port number may not be included.

In another example, the transport layer address (or the IP address) of the eNB and the UDP port number may be configured to be UE-specific (or configured according to each UE). For example, the transport layer address (or the IP address) of the eNB and the UDP port number may be included in radio resource configuration-dedicated information (RadioResourceConfigDedicated). The tunnel endpoint ID may be included in the radio bearer configuration information (DRB-ToAddMod) configured to be radio bearer-specific (or configured according to each radio bearer). When the UDP port number having a specifically designated value is used, the UDP port number may not be included.

Method Using New Tunnel (or Method Using GTP Tunnel of Newly Defined Version)

FIG. 12 illustrates an exemplary GTP-U (GPRS Tunneling Protocol-User Plane) header.

FIG. 12 shows a GTP-U on a 3GPP TS 29.281 GPRS tunneling protocol user plane (GTPv1-U). As illustrated in FIG. 12, since it is required to configure tunnel endpoints to identify many users and/or bearers between two nodes on the LTE network or EPS, the GPT-U header allocates 32 bits to a tunnel endpoint ID (TEID). However, the UE may identify the user by itself. Accordingly, when the tunnel is configured between the UE and the eNB, the smaller number of tunnel end point values may be used rather than that of the tunnel endpoints, which should be provided between two nodes on the network.

For example, when the WLAN carrier is used only for the downlink as illustrated in FIG. 2 and FIG. 4, the tunnel endpoint IDs are configured in consideration of only the number of radio bearers to be provided to one UE from a position of the UE when the downlink tunnel is configured, so that the smaller number of bits may be allocated to a tunnel endpoint ID field. For example, with respect to a logical channel ID (e.g., logicalChannelIdentity) having a value from 3 to 10, 3 bits may be allocated to the tunnel endpoint ID field. Thus 8 values may be configured. Alternatively, the logical channel ID may be used as the tunnel endpoint ID (or the logical channel ID may be included in the tunnel endpoint ID). In another example, with respect to a DRB ID (e.g., drb-Identity) having a value from 1 to 32, 5 bits may be allocated to the tunnel endpoint ID field. Thus 32 values may be configured. Alternatively, the DRB ID may be used as the tunnel endpoint ID (or the DRB ID may be included in the tunnel endpoint ID). In another example, with respect to an eps-BearerIdentity having a value from 0 to 15, 4 bits may be allocated to the tunnel endpoint ID field. Thus 16 values may be configured. Alternatively, the eps-BearerIdentity may be used as the tunnel endpoint ID (or the eps-BearerIdentity may be included in the tunnel endpoint ID). In another example, in consideration of a margin that can be added to the number of radio bearers that the UE can have, 4 bits may be allocated to the tunnel endpoint ID field. Thus 16 values may be configured. In another example, when the number of radio bearers and uplink tunnels which the UE can have is configured, 16+3 or 16+4 bits may be allocated in consideration of a maximum number of UEs (2 to the power of 16) to be accepted by the eNB or a cell within the eNB. In another example, the number of UEs for which the eNB can maintain the RRC connection is significantly smaller than a maximum number of UEs (2 to the power of 16) to be accepted by the eNB or a cell within the eNB, so that 16 bits may be allocated.

As described above, the tunnel using the new tunnel endpoint ID field may differently configure header fields used in the GTP tunnels according to the related art. For example, the header fields on the GTP tunnel according to the related art may be removed, ranges or definitions of different field values may be separately made, or a new field may be additionally used. To distinguish the tunnel defined for the Ux interface from the GTP tunnel version, a new value, which is not the typical value (0, 1, or 2) may be allocated to the version information on the tunnel header. For example, even when a predetermined tunnel, such as the IPSEC, is used, one piece the information described as the tunnel endpoint ID may be used on the tunnel header.

Dynamic Configuration Method through UDP Port Information

The dynamic configuration through UDP port information corresponds to a method of transmitting data to and receiving data from the UE and the eNB through a UDP protocol without GTP tunneling.

As described above, since it is required to configure tunnel endpoints to identify many users and/or bearers between two nodes on the LTE network or EPS, the typical GPT-U header allocates 32 bits to the tunnel endpoint ID (TEID). However, when the WLAN carrier is used only for the downlink as illustrated in FIG. 2 and FIG. 4, the downlink tunnel is configured in consideration of only the number of radio bearers to be provided to one UE from, so that the smaller number of bits may be allocated to a tunnel endpoint ID field. Accordingly, when the WLAN carrier is configured to be used only for the downlink as illustrated in FIG. 2 and FIG. 4, without setting a GTP protocol entity in the UE, the GTP protocol entity may be identified on a transport network layer and dispatch, link, or combination may be performed to a layer 2 entity (e.g., PDCP entity, RLC entity, or Ux UP entity) within a corresponding UE. For example, the E-UTRAN layer 2 entity, the PDCP entity, the RLC entity, or a predetermined entity (for example, Ux UP) associated with the E-UTRAN layer 2 entity may encapsulate user data packets (or E-UTRAN layer 2 PDU or E-UTRAN layer 2 user data) with a UDP header or an IP header.

For example, with respect to a logical channel ID (e.g., logicalChannelIdentity) having a value from 3 to 10, 8 UDP port numbers may be distinguishably used. In another example, with respect to a DRB ID (e.g., drb-Identity) having a value from 1 to 32, 32 UDP port numbers may be distinguishably used. In still another example, with respect to an eps-BearerIdentity having a value from 0 to 15, 16 UDP port numbers may be distinguishably used.

To this end, the eNB may insert UDP port information into radio bearer configuration information (e.g., DRB-ToAddMod) configured to be radio bearer-specific (or configured according to each radio bearer) to transfer the user data (e.g., PDCP PDUs or RLC PDUs) included in the particular radio bearer received by the UE separately or linkedly through the WLAN carrier to the corresponding layer 2 entity (e.g., PDCP entity or RLC entity). The UE having received the UDP port information may transfer the received user data (or PDCP PDUs or RLC PDUs) to the corresponding layer 2 entity (e.g., PDCP entity or RLC entity) based on the UDP port information.

As described above, when the UE transmits user plane data by adding the WLAN carrier to the E-UTRAN carrier, the present disclosure provides an effect of effectively offloading data of the E-UTRAN in rapid consideration of a radio state of the UE at the RAN level and load of the eNB by transmitting user plane data in the unit of radio bearers by using the E-UTRAN carrier and/or the WLAN carrier through the downlink and/or uplink tunnel between the eNB and the UE.

The configurations of the UE and the eNB, which can execute all of the present disclosure described with reference to FIG. 1 to FIG. 12, will be described again with reference to the drawings.

Figure 13:
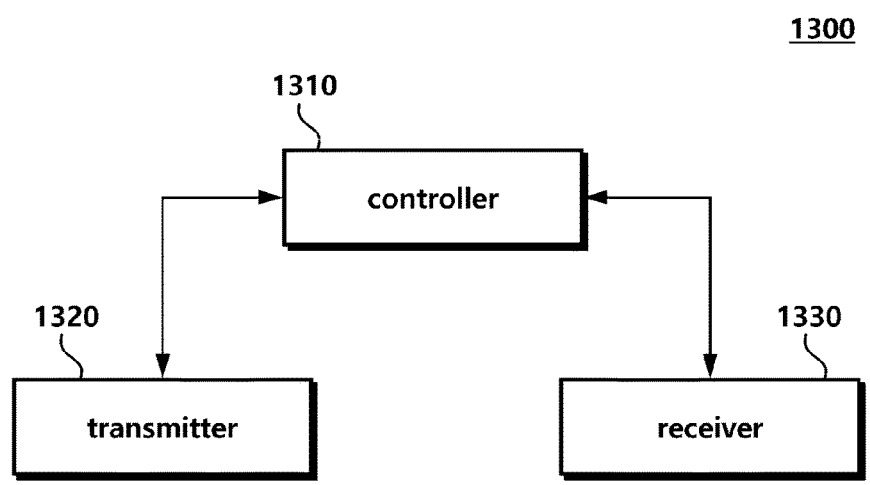
FIG. 13 illustrates a configuration of the UE according to an embodiment of the present disclosure.

FIG. 13 illustrates a configuration of a UE according to an embodiment of the present disclosure.

Referring to FIG. 13, a UE 1300 according to an embodiment of the present disclosure includes a receiver 1330 configured to receive higher layer signal including indication information that makes a request for setting a UE tunnel protocol entity for processing data transmitted and received through a WLAN carrier, and a controller 1310 configured to establish a UE tunnel protocol entity based on the indication information, receive bearer-specific user data, and transfer the bearer-specific user data to a corresponding UE user plane entity.

Further, the receiver 1330 may receive bearer-specific downlink data including a downlink tunnel endpoint ID from the eNB. Meanwhile, the higher layer signaling may include the downlink tunnel endpoint ID in radio bearer configuration information.

Further, the receiver 1330 may further receive radio bearer configuration information of a radio bearer configured to transfer uplink data through the WLAN carrier based on the higher layer signaling. In this case, the radio bearer configuration information may include at least one of transport layer address information of the eNB, a UDP port number, and an uplink tunnel endpoint ID.

Further, the controller 1310 controls general operation of the UE 1300 for transmitting and receiving specific user plane data or specific radio bearer separately or linkedly through the E-UTRAN carrier and/or the WALN carrier on E-UTRAN layer 2 by separating or linking the user plane data units. The controller 1310 may allocate a downlink tunnel endpoint ID.

Meanwhile, the transmitter 1320 may transmit the downlink tunnel endpoint ID to the eNB. Further, the transmitter 1320 may transmit uplink control information, data, and messages required for executing the present disclosure to the eNB.

Figure 14:
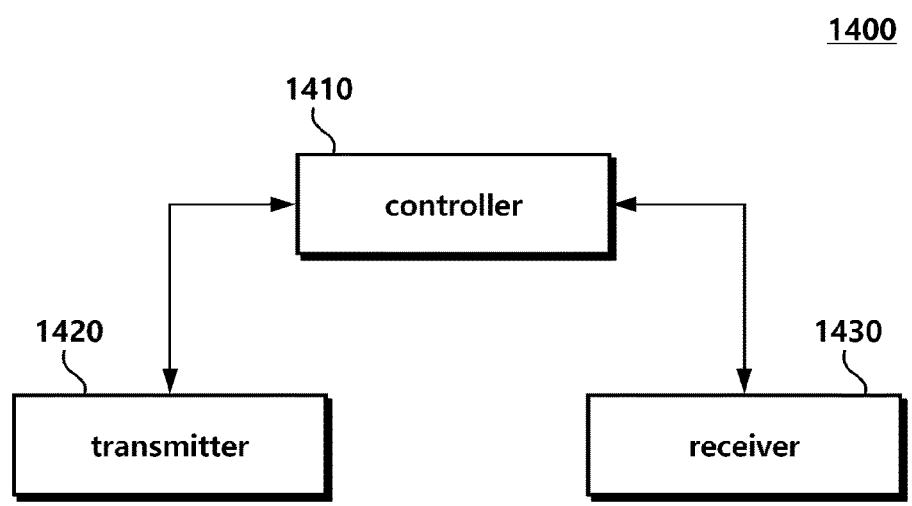
FIG. 14 illustrates a configuration of the eNB according to an embodiment of the present disclosure.

FIG. 14 illustrates a configuration of an eNB according to an embodiment of the present disclosure.

Referring to FIG. 14, an eNB 1400 according to an embodiment of the present disclosure may include a transmitter 1420 configured to transmit higher light signaling including indicating information that makes a request for setting a UE tunnel protocol entity for processing data transmitted and received through a WLAN carrier to the UE and a controller 1410 configured to establish an eNB tunnel protocol entity corresponding to the UE tunnel protocol entity.

The transmitter 1420 may add a downlink tunnel endpoint ID into bearer-specific downlink user data and transmit the bearer-specific downlink user data. Alternatively, the transmitter 1420 may insert radio bearer configuration information including the downlink tunnel endpoint ID into the higher layer signaling and transmit the high layer signaling.

Further, the transmitter 1420 may further transmit radio bearer configuration information of a radio bearer configured to transfer uplink data through the WLAN carrier based on the higher layer signaling. In this case, the radio bearer configuration information may include at least one of transport layer address information of the eNB, a UDP port number, and an uplink tunnel endpoint ID.

Meanwhile, the eNB 1400 may further include a receiver 1430 configured to receive a radio bearer-specific downlink tunnel endpoint ID allocated by the UE.

The controller 1410 controls general operation of the eNB 1400 for transmitting and receiving specific user plane data units or specific radio bearer separately or linkedly through the E-UTRAN carrier and/or the WALN carrier by separating or linking user plane data units on E-UTRAN layer 2.

In addition, the transmitter 1420 and the receiver 1430 may be used for transmitting and receiving a signal, a message, or data required to implement the present disclosure to and from the UE.

Meanwhile, when the UE transmits user plane data included in a particular bearer, the E-UTRAN cannot perform transmission through the E-UTRAN carrier and/or the WLAN carrier with the E-UTRAN carrier maintained by adding the WLAN carrier as one carrier within the E-UTRAN at the RAN level in consideration of a radio state and mobility of the UE.

As described above, to add the WLAN carrier as one carrier within the E-UTRAN at the RAN level by the E-UTRAN and to transmit user plane data included in a particular bearer through the E-UTRAN carrier and/or the WLAN carrier, a method of separating (or splitting or routing)/combining or linking user plane data units on E-UTRAN layer 2 may be considered.

For example, i) first data to be transmitted through the E-UTRAN carrier and ii) second data to be transmitted through the WLAN carrier may be separately transmitted by a PDCP higher entity, and the data may be received (or integratedly received) by a peered PDCP higher entity. Alternatively, the PDCP higher entity may linkedly transmit the second data to be transmitted through the WLAN carrier and the peered PDCP higher entity may receive the data. In another example, first data to be transmitted through the E-UTRAN carrier and second data to be transmitted through the WLAN carrier may be separately transmitted by a PDCP entity, and the data may be received (or integratedly received) by a peered PDCP entity. Alternatively, the PDCP entity may linkedly transmit the second data to be transmitted through the WLAN carrier and the peered PDCP entity may receive the data. In another example, first data to be transmitted through the E-UTRAN carrier and second data to be transmitted through the WLAN carrier may be separately transmitted by an RLC entity, and the data may be received (or integratedly received) by a peered RLC entity. Alternatively, the RLC entity may linkedly transmit the second data to be transmitted through the WLAN carrier and the peered RLC entity may receive the data.

However, to add the WLAN carrier as one carrier within the E-UTRAN at the RAN level and initiate or end transmission of the user plane data included in a particular bearer through the E-UTRAN carrier and/or the WLAN carrier by the E-UTRAN, a control plane procedure is needed between the eNB and UE, but the procedure has not been provided up to now. Particularly, when the UE moves, mobility according to the movement of the UE and service continuity for the user plane data have not been provided.

As described above, the control plane procedure has not been defined between the eNB and the UE to start/initiate or end/terminate transmission of the user plane data included in a particular bearer through the E-UTRAN carrier and/or the WLAN carrier by the E-UTRAN by adding the WLAN carrier as one carrier within the E-UTRAN at the RAN level. Particular, when the UE moves, the service continuity for the user plane data cannot be provided.

An aspect of the present disclosure made to solve the above problem is to provide the control plane procedure between the eNB and the UE to start/initiate or end/terminate the transmission of the user plane data included in the particular bearer through the E-UTRAN carrier and/or the WLAN carrier by adding the WLAN carrier as one carrier within the E-UTRAN at the RAN level by the E-UTRAN. Particularly, an aspect of the present disclosure is to effectively provide, when the UE moves, mobility according to the movement of the UE.

<WLAN Radio Resource Configuration Information>

Figure 15:
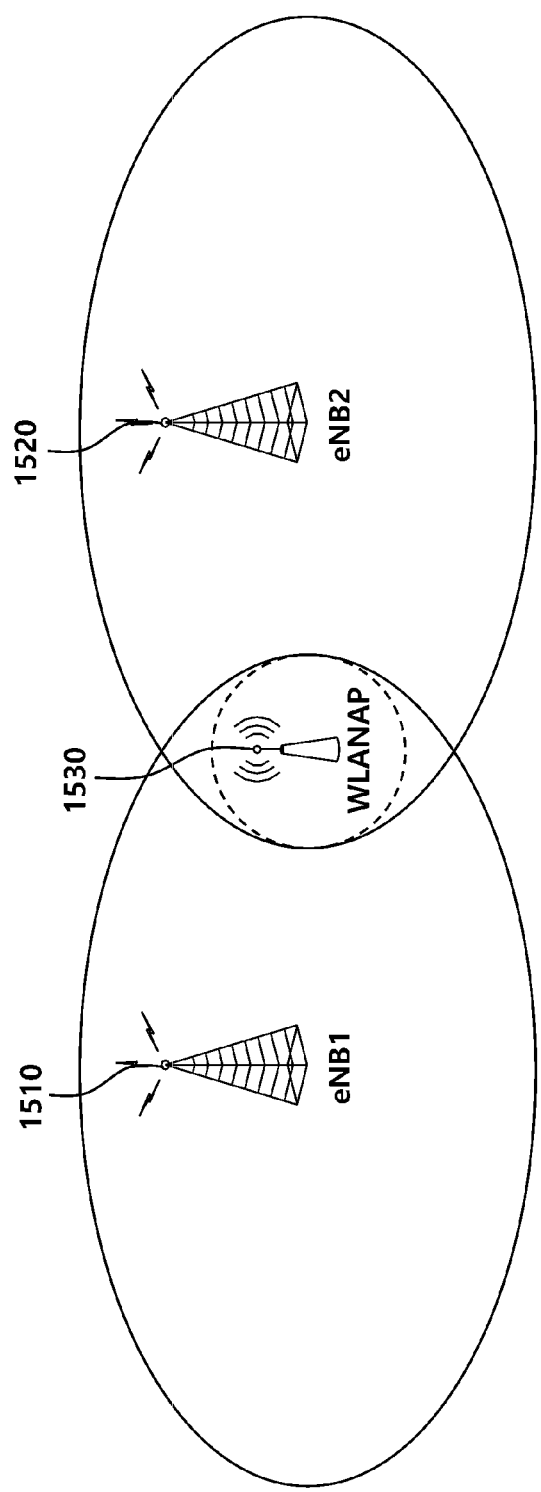
FIG. 15 illustrates an exemplary network configuration scenario according to the present disclosure.

FIG. 15 illustrates an exemplary network configuration scenario according to the present disclosure.

Referring to FIG. 15, a WLAN AP 1530 may be constructed in a cell edge or a place where one or more cell coverages overlap.

When the UE is located in a place where a cell coverage associated with eNB #1 1510 and a WLAN coverage overlap, the UE may set an RRC connection with eNB #1 1510 for transmission of control plane data. Further, the UE may set one or more SRBs (Signaling Radio Bearers). eNB #1 1510 may add a WLAN carrier to the UE for transmission of user plane data and set one or more DRBs (data radio bearers) through the E-UTRAN carrier and/or the WLAN carrier. Meanwhile, the UE may move to a coverage of eNB #2 1520. In this case, the UE may change the cell according to a handover procedure.

A method of the eNB for configuring a radio bearer (DRB) through the WLAN carrier or a radio bearer through the E-UTRAN carrier and the WLAN carrier may vary depending on the scenarios of FIG. 1 to FIG. 4.

For example, in the scenario of FIG. 1, the E-UTRAN carrier and the WLAN carrier may be used for the uplink and downlink transmission of a particular radio bearer. In another example, in the scenario of FIG. 2, the E-UTRAN carrier and the WLAN carrier may be used for the downlink transmission of a particular radio bearer. In still another example, in the scenario of FIG. 4, the E-UTRAN carrier may be used for the uplink transmission of a particular radio bearer. In cases of the scenarios of FIG. 1, FIG. 2, and FIG. 4, to transmit data traffic for the particular radio bearer through the E-UTRAN carrier, the eNB may configure the radio bearer through the E-UTRAN carrier in the UE based on the typical DRB configuration information (for example, detailed information elements on DRB-ToAddMod). Further, to process data traffic to be transmitted and received through the WLAN among data traffic for the radio bearers, the eNB may configure configuration information for establishing transmission and reception additional functions through the WLAN carrier in the UE. The DRB configuration information is included in an information element of a radio resource configuration-dedicated information (e.g., RadioResourceConfigDedicated). The radio resource configuration-dedicated information is used for set up/changing/release radio bearers, changing an MAC main configuration, changing an SPS configuration, or changing a dedicated physical configuration.

In another example, in the scenario of FIG. 3, the WLAN carrier may be used for the uplink and downlink transmission of the particular radio bearer. In the case of the scenario of FIG. 3, since data traffic for the particular radio bearer is not transmitted through the E-UTRAN carrier, it is not required to configure the typical DRB configuration information included in the information element of the radio resource configuration-dedicated information (RadioResource ConfigDedicated). Accordingly, it is needed to define new configuration information for identifying radio bearers transmitted through the WLAN carrier. Further, to process data traffic for radio bearers transmitted through the WLAN, the eNB may configure configuration information for establishing transmission and reception additional functions through the WLAN carrier in the UE. The configuration information for establishing additional functions for transmission and reception through the WLAN carrier may include WLAN cell configuration information for configuring the WLAN carrier. The WLAN cell configuration information may include one or more pieces of WLAN cell identifier information, WLAN mobility set identifier information, band/frequency information, a WLAN ID (e.g., BSSID/HESSID/SSIDs), information indicating a WLAN access authentication in a corresponding cell to perform the WLAN access authentication among WLAN cells, and information indicating a WLAN primary cell to perform data transmission through the WLAN among the WLAN cells.

In the scenario of FIG. 1, as an example of additional functions for transmission and reception through the WLAN carrier, it may be required to set a routing function of a transmission part and a reordering function of a reception part in the entity (for example, PDCP or RLC entity) generating separation/combination according to each radio bearer. Alternatively, as another example of the additional functions, it may be required to set the access of the UE to the WLAN or data communication through the WLAN between the UE and the eNB. Alternatively, as another example of the additional functions, it may be required to set the mapping of user plane data to a corresponding radio bearer layer 2 entity by the UE (or eNB) having received the user plane data transmitted from each radio bearer layer 2 entity within the eNB (or UE) through the WLAN.

For the additional functions, the eNB may transmit, to the UE, WAN radio resource configuration-dedicated information for setting data transmission using the WLAN carrier. The WLAN radio resource configuration-dedicated information may include information required by the UE for transmitting and receiving data of a particular radio bearer through the WLAN carrier. For example, the WLAN radio resource configuration-dedicated information may include information indicating the routing function of the transmission part and the reordering function of the reception part in the entity (for example, PDCP or RLC entity) generating separation/combination in bearer configuration information or corresponding layer 2 entity configuration information. For example, bearer type division information may be included. In another example, a detailed information element for indicating layer 2 entity configuration information may be included in the corresponding layer 2 entity configuration information. Such information corresponds to radio bearer-dedicated information and thus may be included in radio resource configuration-dedicated information.

In another example, the WLAN radio resource configuration-dedicated information may include WALN cell configuration information for configuring the WLAN carrier through which the UE transfer data of a particular radio bearer. The WLAN cell configuration information may include one or more pieces of WLAN cell identifier information, WLAN mobility set identifier information, band/frequency information, a WLAN ID (BSSID/HESSID/SSIDs), information indicating a WLAN access authentication in a corresponding cell to perform the WLAN access authentication among WLAN cells, and information indicating a WLAN primary cell to perform data transmission through the WLAN among the WLAN cells.

The WLAN radio resource configuration-dedicated information for configuring the access to the WLAN AP and/or data communication through the WLAN carrier between the UE and the eNB may include one or more pieces of WLAN ID (for example, SSID, BSSID, or HESSID), encryption algorithm information, and key information. Since the WLAN radio resource configuration-dedicated information is applied only to a radio bearer group using transmission through the WLAN carrier, radio resource configuration-dedicated information (for example, indicated by RadioResourceConfigDedicatedWLAN) for a radio bearer group using transmission through the WLAN carrier distinguished from the typical radio resource configuration-dedicated information may be defined and used. The RadioResourceConfigDedicatedWLAN refers to radio resource configuration-dedicated information for the radio bearer group using the transmission through the WLAN carrier distinguished from the typical radio resource configuration-dedicated information and is described as WLAN radio resource configuration-dedicated information in this specification, but is not limited thereto.

Alternatively, to instruct the UE having received user plane data transmitted from each radio bearer layer 2 entity within the eNB through the WLAN carrier to map the user plane data to the corresponding radio bearer layer 2 entity, the bearer configuration information or the corresponding layer 2 configuration information may include information for indicating the mapping. For example, tunnel configuration information may be included. In another example, an ID for mapping a corresponding layer 2 PDU, information encapsulated to the corresponding layer 2 PDU to map the corresponding layer 2 PDU, or header information may be included. Since the indicated information, the ID, the encapsulated information, or the header information corresponds to radio bearer-dedicated information, and thus may be included in radio resource configuration-dedicated information. Alternatively, since the indicated information, the ID, the encapsulated information, or the header information is applied only to a radio bearer group using transmission through the WLAN carrier, the above information may be included in WLAN radio resource configuration-dedicated information for the radio bearer group using the transmission through the WLAN carrier distinguished from the typical radio resource configuration-dedicated information.

In the scenario of FIG. 2, as an example of additional functions for transmission and reception through the WLAN carrier, it may be required to set a (transmission) routing function in the PDCP entity or the RLC entity of the eNB according to each radio bearer and a (reception) reordering function in the PDCP entity or the RCL entity of the UE. Alternatively, as another example of the additional functions, it may be required to set the access of the UE to the WLAN and/or the data communication through the WLAN carrier between the UE and the eNB. Alternatively, as still another example of the additional functions, it may be required to set the mapping of user plane data to a corresponding radio bearer layer 2 entity by the UE having received the user plane data transmitted from each radio bearer layer 2 entity within the eNB through the WLAN carrier.

To indicate the reordering function of the reception part in the entity (for example, PDCP or RLC entity) generating a combination within the UE, information for indicating the reordering function may be included in the bearer configuration information or the corresponding layer 2 entity configuration information. For example, bearer type division information may be included. In another example, a detailed information element for indicating layer 2 entity configuration information may be included in the corresponding layer 2 entity configuration information. The above described information corresponds to radio bearer-dedicated information, and thus may be included in radio resource configuration-dedicated information.

The WLAN radio resource configuration-dedicated information for configuring the access to the WLAN AP and/or data communication through the WLAN carrier between the UE and the eNB may include one or more pieces of the WLAN ID (for example, SSID, BSSID, or HESSID), encryption algorithm information, and key information. Since the WLAN radio resource configuration-dedicated information is applied only to a radio bearer group using transmission through the WLAN carrier, radio resource configuration-dedicated information (for example, indicated by RadioResourceConfigDedicatedWLAN) for a radio bearer group using transmission through the WLAN carrier distinguished from the typical radio resource configuration-dedicated information may be defined and used.

Alternatively, to instruct the UE having received user plane data transmitted from each radio bearer layer 2 entity within each eNB through the WLAN carrier to map the user plane data to the corresponding radio bearer layer 2 entity, the bearer configuration information or the corresponding layer 2 configuration information may include information for indicating the mapping. For example, tunnel configuration information may be included. In another example, an ID for mapping a corresponding layer 2 PDU, information encapsulated to the corresponding layer 2 PDU to map the corresponding layer 2 PDU, or header information may be included. Since the indicated information, the ID, the encapsulated information, or the header information corresponds to radio bearer-dedicated information, and thus may be included in radio resource configuration-dedicated information. Alternatively, since the indicated information, the ID, the encapsulated information, or the header information is applied only to a radio bearer group using transmission through the WLAN carrier, the above information may be included in WLAN radio resource configuration-dedicated information for the radio bearer group using the transmission through the WLAN carrier distinguished from the typical radio resource configuration-dedicated information.

In the scenario of FIG. 3, as an example of additional functions for transmission and reception through the WLAN carrier, it may be required to set the access of the UE to the WLAN and/or the data communication through the WLAN carrier between the UE and the eNB. Alternatively, as another example of the additional functions, it may be required to set the mapping of user plane data to a corresponding radio bearer layer 2 entity by the UE (or eNB) having received the user plane data transmitted from each radio bearer layer 2 entity within the eNB (or UE) through the WLAN.

The WLAN radio resource configuration-dedicated information for configuring the access to the WLAN AP and/or data communication through the WLAN carrier between the UE and the eNB may include one or more pieces of the WLAN ID (for example, SSID, BSSID, or HESSID), encryption algorithm information, and key information. Since the WLAN radio resource configuration-dedicated information is applied only to a radio bearer group using transmission through the WLAN carrier, radio resource configuration-dedicated information (for example, indicated by RadioResourceConfigDedicatedWLAN) for a radio bearer group using transmission through the WLAN carrier distinguished from the typical radio resource configuration-dedicated information may be defined and used.

Alternatively, the bearer configuration information or the corresponding layer 2 configuration information may include information for indicating the bearer configuration information or the corresponding layer 2 configuration information to instruct the UE having received user plane data transmitted from each radio bearer layer 2 entity through the WLAN carrier to map the user plane data to the corresponding radio bearer layer 2 entity.

To instruct the eNB to receive user plane data transmitted from each radio bearer layer 2 entity within the UE through the WLAN carrier and map the user plane data to a radio bearer layer 2 entity within the eNB, bearer configuration information or corresponding layer 2 configuration information may include information for indicating the reception and the mapping.

For example, tunnel configuration information may be included. In another example, an ID for mapping a corresponding layer 2 PDU, information encapsulated to the corresponding layer 2 PDU to map the corresponding layer 2 PDU, or header information may be included. Such information is applied only to a radio bearer group using transmission through the WLAN carrier, and thus may be included in WLAN radio resource configuration-dedicated information for the radio bearer group using the transmission through the WLAN carrier distinguished from the typical radio resource configuration-dedicated information.

In the scenario of FIG. 4, as an example of additional functions for transmission and reception through the WLAN carrier, it may be required to set the access of the UE to the WLAN and/or the data communication through the WLAN carrier between the UE and the eNB. Alternatively, as still another example of the additional functions, it may be required to set mapping of user plane data to a corresponding radio bearer layer 2 entity by the UE having received the user plane data transmitted from each radio bearer layer 2 entity within the eNB through the WLAN.

The WLAN radio resource configuration-dedicated information for configuring the access of the UE to the WLAN and/or data communication through the WLAN carrier between the UE and the eNB may include one or more pieces of the WLAN ID (for example, SSID, BSSID, or HESSID), encryption algorithm information, and key information. Such information is applied only to a radio bearer group using transmission through the WLAN carrier, and thus may be included in WLAN radio resource configuration-dedicated information for the radio bearer group using the transmission through the WLAN carrier distinguished from the typical radio resource configuration-dedicated information.

Alternatively, the bearer configuration information or the corresponding layer 2 configuration information may include information for indicating the bearer configuration information or the corresponding layer 2 configuration information to instruct the UE having received user plane data transmitted from each radio bearer layer 2 entity through the WLAN carrier to map the user plane data to the corresponding radio bearer layer 2 entity. For example, tunnel configuration information may be included. In another example, an ID for mapping a corresponding layer 2 PDU, information encapsulated to the corresponding layer 2 PDU to map the corresponding layer 2 PDU, or header information may be included. Since the indicated information, the ID, the encapsulated information, or the header information corresponds to radio bearer-dedicated information, and thus may be included in radio resource configuration-dedicated information. Alternatively, since the indicated information, the ID, the encapsulated information, or the header information is applied only to a radio bearer group using transmission through the WLAN carrier, the above information may be included in WLAN radio resource configuration-dedicated information for the radio bearer group using the transmission through the WLAN carrier distinguished from the typical radio resource configuration-dedicated information.

As described above, the UE and the eNB according to the present disclosure may define and use the WLAN radio resource configuration-dedicated information according to each of the scenarios of FIG. 1 to FIG. 4 to transmit and receive data through the WLAN carrier. That is, the WLAN radio resource configuration-dedicated information may include set information for the radio bearer group including one or more radio bearers configured to transmit and receive data through the WLAN carrier. Further, as described above for each of the scenarios of FIG. 1 to FIG. 4, the WLAN radio resource configuration-dedicated information may include WLAN cell configuration information and WLAN radio bearer configuration information such as various pieces of indication information, ID, tunnel information, encryption information, and key information according to each scenario.

<WLAN Transmission>

As described above, in each scenario, the eNB may establish the access of the UE to the WLAN AP and the data communication through the WLAN carrier between the UE and the eNB as the additional functions for transmission and reception through the WLAN carrier. For example, the UE may receive WLAN radio resource configuration-dedicated information including information for setting or indicating the access of the UE to the WLAN AP and/or the data communication through the WLAN carrier between the UE and the eNB from the eNB. When receiving an RRC connection reconfiguration message including the WLAN radio resource configuration-dedicated information, the UE may set the access to the WLAN AP/access authentication/tunnel setup and/or an entity/layer/function for performing the data communication through the WLAN carrier between the UE and the eNB. The UE may transmit an RRC connection reconfiguration complete message to the eNB.

The UE may attempt the access/access authentication/tunnel setup through the WLAN AP and the data communication through the WLAN carrier between the UE and the eNB. The UE may inform the eNB of success or failure of the access/access authentication/data communication through the WLAN carrier.

For example, when the failure is detected in a WLAN access authentication or a tunnel setup process, the UE may inform the eNB of the failure.

The failure on the WLAN radio link may include one or more of i) a case where a WLAN radio link (for example, a beacon RSSI, channel utilization, a backhaul rate, or a WLAN signal strength) is lower than a particular threshold value, ii) a case where a WLAN radio link quality lower than a particular threshold value continues for a predetermined time, iii) a case where feedback for WLAN transmission is not received for a predetermined time, a case where a predetermined number or more of losses are detected in feedback for WLAN transmission, iv) a case where a WLAN access authentication fails, v) a case where a WLAN access authentication is not successful for a predetermined time, and vi) a case where a WLAN tunnel setup is not successful for a predetermined time or by a predetermined number of attempts.

The success or failure of the access of the UE to the eNB through the WLAN AP or the data communication through the WLAN carrier may be known before, after, or at the same time the RRC connection reconfiguration complete message is transmitted.

Meanwhile, since the UE can move, the UE may change an eNB according to a movement as illustrated in FIG. 15. This is referred to as a handover, and data transmission and reception through the WLAN carrier may be maintained or released when the UE performs the handover. Accordingly, hereinafter, data processing through the WLAN carrier in a handover procedure of the UE will be described.

<Handover Preparation>

According to the present disclosure, a handover occurred when the UE moves from a location where an eNB (eNB1) coverage and a WLAN coverage overlap to a location where another eNB (eNB2) coverage and the WLAN coverage overlap will be described. An eNB currently maintaining an RRC connection to the UE is referred to as a source eNB, and an eNB which the UE desires to move and to perform an RRC connection therefor is referred to as a target eNB.

When the source eNB determines the handover of the UE based on a measurement report and RRM information, the source eNB transmits a handover request message including information required by the target eNB for preparing the handover to the target eNB. The handover request message includes a handover preparation information (HandoverPreparationInformation) message.

Further, the handover preparation information message includes an AS-Config IE (information element). The AS-Config IE is related to RRC configuration information (or RRC context) within the source eNB and may be used for determining a need to change the RRC configuration by the target eNB for a handover preparation step. The AS-Config IE information may be used after the handover has been successfully performed, or the AS-Config IE information may be used for an RRC connection re-establishment.

FIG. 16 illustrates an exemplary AS-Config IE (Information Element) according to the related art.

In the typical LTE technology, the As-Config IE included only the typical radio resource configuration-dedicated information (RadioResourceConfigDedicated) as radio resource configuration-dedicated information of a source eNB, and thus a target eNB could not receive configuration information (for example, the WLAN radio resource configuration-dedicated information, radio bearer configuration information using the WLAN carrier, or WLAN cell configuration information) related to a radio bearer group using transmission through the WLAN carrier. Accordingly, it is not possible to provide a service continuity of data transmission of radio bearers using the transmission through the WLAN carrier. That is, when the UE performs a handover, data transmission using the WLAN carrier could not continue or could not be rapidly re-configured even though the UE is within the coverage of the same WLAN AP.

According to the present disclosure, to secure the continuity of data transmission and reception through the WLAN carrier, the AS-Config IE includes WLAN radio resource configuration-dedicated information (for example, RadioResourceConfigDedicatedWLAN) of the radio bearer group using transmission through the WLAN carrier distinguished from the typical radio resource configuration-dedicated information (RadioResourceConfig Dedicated).

Alternatively, according to the present disclosure, the AS-Config IE may include a WLAN measurement result. Alternatively, according to the present disclosure, the AS-Config IE may include a measurement result of an E-UTRAN serving cell. Alternatively, according to the present disclosure, the AS-Config IE may include measurement configuration information for WLAN measurement. The WLAN radio measurement has many differences in a measurement channel and a measurement signal from the E-UTRAN measurement configuration according to the related art. Further, the WLAN measurement configuration information may include one or more pieces of information included in WLAN offload configuration information (WLAN-OffloadConfig) or one or more pieces of WLAN information (for example, one or more pieces of information of WLAN channel use rate (BSS load), up/down backhaul bandwidth, offload preferenceIndicator, RCPI: Received Channel Power Indicator, beacon RSSI: Received Signal Strength Indicator, WLAN ID (BSSID/HESSID/SSIDs), WLAN band, and WLAN frequency). Further, the WLAN measurement configuration may be configured to measure channel load for determining a WLAN channel to be used by the UE through a scheme (for example, energy detection scheme) different from a BSS load scheme using a WLAN beacon. Accordingly, the measurement configuration for the WLAN measurement may be set using other measurement configuration information distinguished from the typical measurement configuration (measconfig) and, in this case, the measurement configuration may be included in the AS-Config IE.

The measurement configuration information for the WLAN measurement described through the different method may be included in an RRM-Config IE. Further, the WLAN measurement configuration information may include one or more pieces of information included in WLAN offload configuration information (WLAN-OffloadConfig) or one or more pieces of WLAN information (for example, one or more pieces of information of WLAN channel use rate (BSS load), up/down backhaul bandwidth, offload preferenceIndicator, RCPI: Received Channel Power Indicator, beacon RSSI: Received Signal Strength Indicator, WLAN ID (BSSID/HESSID/SSIDs), WLAN band, and WLAN frequency). In addition, the eNB may select WLAN channel information to be changed by the radio bearer using the WLAN carrier and transmit the WLAN channel information to the UE through the WLAN channel use rate (BSS load) or the load information of the WLAN channel included in the measurement report received from the UE. Alternatively, the eNB may allow the UE to select a proper WLAN channel in a WLAN access process without a need to transmit the WLAN channel information to the UE.

The target eNB may add, change, or release the radio resource configuration through the WLAN carrier based on one or more pieces of the above described information in a handover execution step, a handover completion step, or after a handover.

<UE Operation according to Reception of Handover Message>

1) Release of WLAN Carrier Configuration

The target eNB may instruct the UE to release the entire WLAN carrier configuration through a handover message. For example, the configured WLAN cell may be released. In another example, the configured WLAN cell and a WLAN bearer associated with the corresponding WLAN cell may be released. To this end, the target eNB may insert information for instructing the UE to release the entire WLAN carrier configuration into the handover message. Alternatively, when receiving WLAN radio resource configuration-dedicated information for a radio bearer group using transmission through the WLAN carrier via the source eNB, the target eNB may insert information for instructing the UE to release the entire WLAN carrier configuration into the handover message.

According to the release of the WLAN carrier configuration, the radio bearer typically transmitted through the WLAN carrier may be transmitted through the E-UTRAN carrier. For example, the target eNB may insert, into the handover message, configuration information for instructing the UE to release the radio bearer transmitted through the WLAN carrier and to add/change the corresponding released radio bearer to the radio bearer configuration information (DRB-ToAddMod) through the eNB carrier. In another example, the target eNB may insert, into the handover message, information for instructing the UE to add/change the radio bearer transmitted through the WLAN carrier to the typical radio bearer configuration information (DRB-ToAddMod) through the eNB carrier. In another example, in a case of a WLAN bearer (for example, a WLAN switch bearer configured through an IPsec tunnel) transmitting downlink or uplink data only through the WLAN carrier illustrated in FIG. 3 or FIG. 4, the eNB may insert information for instructing the UE to switch/change/modify the radio bearer transmitted and received through the WLAN carrier to a radio bearer through the eNB carrier associated with the corresponding WLAN carrier radio bearer into the handover message.

2) Release and Addition of WLAN Carrier Configuration

The target eNB may instruct the UE to release the entire WLAN carrier configuration through a handover message.

For example, the configured WLAN cell may be released. In another example, the configured WLAN cell and a WLAN bearer associated with the corresponding WLAN cell may be released. To this end, the target eNB may insert information for instructing the UE to release the entire WLAN carrier configuration into the handover message. However, the target eNB may add/set/reset/change/modify the WLAN carrier configuration through the same handover message.

According to the release and addition of the WLAN carrier configuration, the radio bearer transmitted through the typical WLAN carrier may be transmitted through the WLAN carrier. For example, the target eNB may insert information for instructing the UE to maintain the radio bearer transmitted through the WLAN carrier into the handover message. In another example, the target eNB may insert information for instructing the UE to set/reset/change/modify the radio bearer transmitted through the WLAN carrier into the handover message.

The layer 2 entity (for example, PDCP entity or RLC entity) of the radio bearer transmitted through the WLAN carrier may be reset according to the handover. Alternatively, the layer 2 entity (for example, PDCP entity or RLC entity) of the radio bearer transmitted through the WLAN carrier may be reset to maintain the entity without any reset according to the handover.

3) Maintain WLAN Carrier Configuration

For example, the target eNB may instruct the UE to maintain the WLAN carrier configuration through a handover message. To this end, the target eNB may insert information for instructing the UE to maintain the WLAN carrier configuration into the handover message.

In another example, the target eNB may instruct the UE to set the WLAN carrier configuration through the handover message. To this end, the target eNB may insert information for instructing the UE to set/maintain the WLAN carrier configuration into the handover message.

In another example, the target eNB may instruct the UE to reset the WLAN carrier configuration through the handover message. To this end, the target eNB may insert information for instructing the UE to reset the WLAN carrier configuration into the handover message.

According to the maintenance of the WLAN configuration, the radio bearer transmitted through the typical WLAN carrier may maintain the transmission through the WLAN carrier. For example, the target eNB may insert information for instructing the UE to maintain the radio bearer transmitted through the WLAN carrier into the handover message. In another example, the target eNB may include information for instructing the UE to set/reset the radio bearer transmitted through the WLAN carrier into the handover message.

The layer 2 entity (for example, PDCP entity or RLC entity) of the radio bearer transmitted through the WLAN carrier may be reset according to the handover. Alternatively, the layer 2 entity (for example, PDCP entity or RLC entity) of the radio bearer transmitted through the WLAN carrier may be reset to maintain the entity without any reset according to the handover.

As described above, as the E-UTRAN adds the WLAN carrier as one carrier within the E-UTRAN at the RAN level through the present disclosure, control plane configuration information for performing transmission user plane data included in a particular bearer through the E-UTRAN carrier and/or the WLAN carrier can be provided. Particularly, when the UE moves, there is an effect of continuously serving user plane data transmitted through the WLAN carrier.

Hereinafter, the operations of the UE and the eNB that can perform each embodiment of the present disclosure described above will be described again with reference to the drawings.

Figure 17:
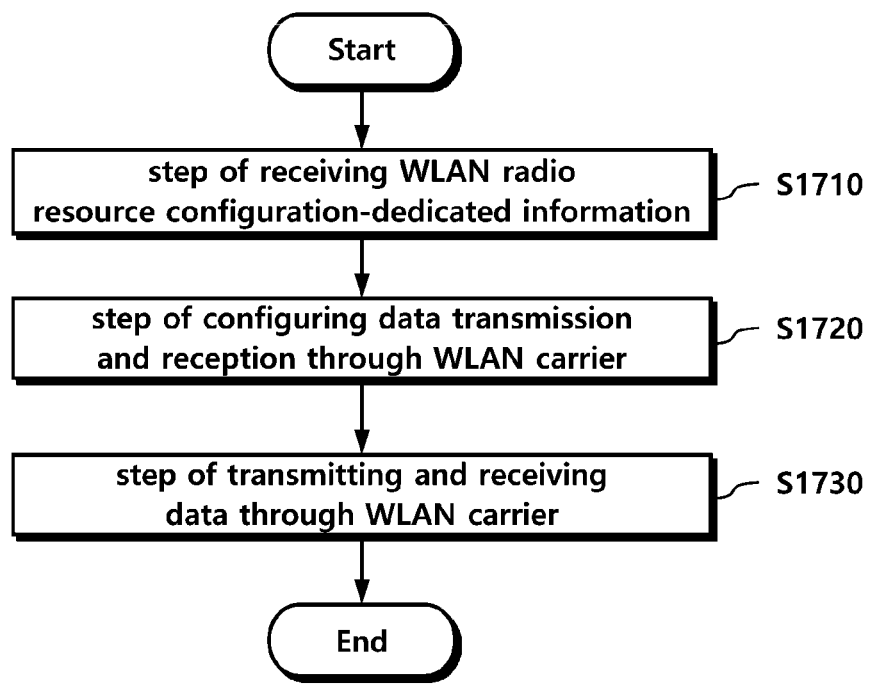
FIG. 17 illustrates operations of a UE according to an embodiment of the present disclosure.

FIG. 17 illustrates an operation of a UE according to an embodiment of the present disclosure.

The UE according to an embodiment of the present disclosure may perform an operation of receiving WLAN radio resource configuration-dedicated information for setting data transmission and reception using the WLAN carrier from the eNB, an operation of setting a radio bearer group including one or more radio bearers to transmit and receive data through the WLAN carrier based on the WLAN radio resource configuration-dedicated information, and an operation of transmitting and receiving the data of the radio bearer group through the WLAN carrier.

Referring to FIG. 17, the UE may perform an operation of receiving the WLAN radio resource configuration-dedicated information for setting the data transmission and reception using the WLAN carrier from the eNB in S1710. The WLAN radio resource configuration-dedicated information may include at least one of a WLAN ID, encryption algorithm information, and key information. Alternatively, the WLAN radio resource configuration-dedicated information may include information for instructing the UE having received the user plane data transmitted through the WLAN carrier from a layer 2 entity of each radio bearer within the eNB to map the user plane data to the corresponding radio bearer layer 2 entity in bearer configuration information or corresponding layer 2 configuration information. For example, the WLAN radio resource configuration-dedicated information may include tunnel configuration information. In another example, the WLAN radio resource configuration-dedicated information may include an ID for mapping a corresponding layer 2 PDU, information encapsulated into the corresponding layer 2 PDU to map the corresponding layer 2 PDU, or header information. The WLAN radio resource configuration-dedicated information may be information configured to be distinguished from radio resource configuration-dedicated information of a radio bearer transmitting and receiving data through the eNB carrier.

Further, the UE may perform an operation of setting a radio bearer group including one or more radio bearers to transmission and reception data through the WLAN carrier based on the WLAN radio resource configuration-dedicated information in S1720. The radio bearer group includes one or more radio bearers that transmit and receive data to and from the eNB through the WLAN carrier. The UE may configure the corresponding radio bearer to transmit and receive data through the WLAN carrier based on radio bearer configuration information included in the WLAN radio resource configuration-dedicated information.

Further, the UE may perform an operation of transmitting and receiving the data of the radio bearer group through the WLAN carrier in S1730. The UE may transmit and receive the data of the corresponding radio bearer to and from the eNB through the configured WLAN carrier. The UE may transmit or receive data through the WLAN carrier according to each of the scenarios described in FIG. 1 to FIG. 4.

Meanwhile, when the handover of the UE is determined, the eNB may transmit WLAN measurement information and WLAN radio resource configuration-dedicated information to the target eNB. The WLAN radio resource configuration-dedicated information transmitted to the target eNB may be transmitted while being inserted into a handover request message. The target eNB may release the configuration of the WLAN radio resources and transmit and receive data of a radio bearer group through the eNB carrier.

Figure 18:
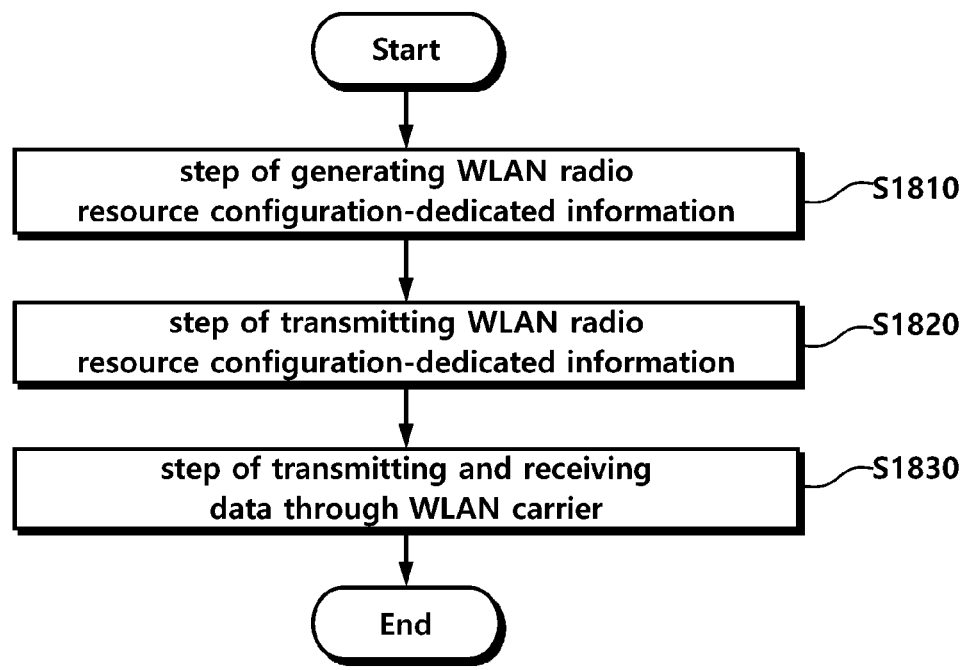
FIG. 18 illustrates operations of an eNB according to an embodiment of the present disclosure.

FIG. 18 illustrates an operation of an eNB according to an embodiment of the present disclosure.

The eNB according to an embodiment of the present disclosure may perform an operation of generating WLAN radio resource configuration-dedicated information for setting data transmission and reception using the WLAN carrier, an operation of transmitting the WLAN radio resource configuration-dedicated information to the UE, and an operation of transmitting and receiving data of a radio bearer group including one or more radio bearers, and the WLAN radio resource configuration-dedicated information may include information for setting the radio bearer group to transmit and receive data through the WLAN carrier.

Referring to FIG. 18, the eNB according to the present disclosure may include an operation of generating the WLAN radio resource configuration-dedicated information for setting data transmission and reception using the WLAN carrier in S1810. The WLAN radio resource configuration-dedicated information may include information for setting the radio bearer group to transmit and receive data through the WLAN carrier. The WLAN radio resource configuration-dedicated information may include at least one of a WLAN ID, encryption algorithm information, and key information. Alternatively, the WLAN radio resource configuration-dedicated information may include information for instructing the UE having received the user plane data transmitted through the WLAN carrier from a layer 2 entity of each radio bearer within the eNB to map the user plane data to the corresponding radio bearer layer 2 entity in bearer configuration information or corresponding layer 2 configuration information. For example, the WLAN radio resource configuration-dedicated information may include tunnel configuration information. In another example, the WLAN radio resource configuration-dedicated information may include an ID for mapping a corresponding layer 2 PDU, information encapsulated into the corresponding layer 2 PDU to map the corresponding layer 2 PDU, or header information. The WLAN radio resource configuration-dedicated information may be information configured to be distinguished from radio resource configuration-dedicated information of a radio bearer transmitting and receiving data through the eNB carrier.

Further, the eNB may perform an operation of transmitting the WLAN radio resource configuration-dedicated information to the UE in S1820. The eNB may transfer information on the radio bearer group configured to transmit and receive data through the WLAN carrier to the UE through the WLAN radio resource configuration-dedicated information. The UE may configure the radio bearer group including one or more radio resources to transmit and receive data through the WLAN carrier based on the received WLAN radio resource configuration-dedicated information.

Further, the eNB may perform an operation of transmitting and receiving the data of the radio bearer group including one or more radio bearers through the WLAN carrier in S1830. When the radio bearer group using the WLAN carrier is set in the UE, the eNB may transmit and receive data to and from the UE through the WLAN carrier by the radio bearer included in the corresponding radio bearer group. The eNB may transmit or receive data through the WLAN carrier according to each of the scenarios described in FIG. 1 to FIG. 4.

Hereinafter, the configurations of the UE and the eNB that execute the present disclosure will be described with reference again to FIG. 13 and FIG. 14.

Referring back to FIG. 13, the UE 1300 may include the receiver 1330 configured to receive WLAN radio resource configuration-dedicated information for establishing data transmission and reception using the WLAN carrier from the eNB, the controller 1310 configured to establish a radio bearer group including one or more radio bearers to transmit and receive data through the WLAN carrier based on the WLAN radio resource configuration-dedicated information, and the transmitter 1320 configured to transmit the data of the radio bearer group through the WLAN carrier.

The WLAN radio resource configuration-dedicated information received by the receiver 1330 may include at least one piece of a WLAN ID, encryption algorithm information, and key information. Alternatively, the WLAN radio resource configuration-dedicated information may include information for instructing the UE having received the user plane data transmitted through the WLAN carrier from a layer 2 entity of each radio bearer within the eNB to map the user plane data to the corresponding radio bearer layer 2 entity in bearer configuration information or corresponding layer 2 configuration information. For example, the WLAN radio resource configuration-dedicated information may include tunnel configuration information. In another example, the WLAN radio resource configuration-dedicated information may include an ID for mapping a corresponding layer 2 PDU, information encapsulated into the corresponding layer 2 PDU to map the corresponding layer 2 PDU, or header information. The WLAN radio resource configuration-dedicated information may be information configured to be distinguished from radio resource configuration-dedicated information of a radio bearer transmitting and receiving data through the eNB carrier. In addition, the receiver 1330 may receive downlink control information, downlink data, and a message from the eNB through a corresponding channel.

Further, the controller 1310 controls general operation of the UE 1300 to provide control plane configuration information for transmitting user plane data included in a particular bearer through the E-UTRAN carrier and/or the WLAN carrier by adding the WLAN as one carrier within the E-UTRAN at the RAN level by the E-UTRAN in accordance with at least one embodiment of the present disclosure.

Further, the transmitter 1330 transmits uplink control information, data, and messages to the eNB through the corresponding channel.

Meanwhile, as described above, when the handover of the UE is determined, the eNB may transmit WLAN measurement information and WLAN radio resource configuration-dedicated information to a target eNB. The WLAN radio resource configuration-dedicated information transmitted to the target eNB may be transmitted while being inserted into a handover request message. The target eNB may release the configuration of the WLAN radio resources and transmit and receive data of a radio bearer group through the eNB carrier.

Referring back to FIG. 14, the eNB 1400 according to the present disclosure may include the controller 1410 configured to generate WLAN radio resource configuration-dedicated information for setting data transmission and reception through the WLAN carrier, the transmitter 1420 configured to transmit the WLAN radio resource configuration-dedicated information to the UE, and the receiver 1430 configured to receive the data of the radio bearer group including one or more radio resources through the WLAN carrier. The WLAN radio resource configuration-dedicated information may include at least one of a WLAN ID, encryption algorithm information, and key information. Alternatively, the WLAN radio resource configuration-dedicated information may include information for instructing the UE having received the user plane data transmitted through the WLAN carrier from a layer 2 entity of each radio bearer within the eNB to map the user plane data to the corresponding radio bearer layer 2 entity in bearer configuration information or corresponding layer 2 configuration information. For example, the WLAN radio resource configuration-dedicated information may include tunnel configuration information. In another example, the WLAN radio resource configuration-dedicated information may include an ID for mapping a corresponding layer 2 PDU, information encapsulated into the corresponding layer 2 PDU to map the corresponding layer 2 PDU, or header information. The WLAN radio resource configuration-dedicated information may be information configured to be distinguished from radio resource configuration-dedicated information of a radio bearer transmitting and receiving data through the eNB carrier.

The controller 1410 controls general operation of the UE 1400 to provide control plane configuration information for transmitting user plane data included in a particular bearer through the E-UTRAN carrier and/or the WLAN carrier by adding the WLAN as one carrier within the E-UTRAN at the RAN level by the E-UTRAN required according to at least one embodiment of the present disclosure.

Further, when the handover of the UE is determined, the transmitter 1420 may transmit WLAN measurement information and WLAN radio resource configuration-dedicated information to a target eNB. The WLAN radio resource configuration-dedicated information transmitted to the target eNB may be transmitted while being inserted into a handover request message. The target eNB may release the configuration of the WLAN radio resources and transmit and receive data of a radio bearer group through the eNB carrier.

In addition, the transmitter 1420 and the receiver 1430 may be used for transmitting and receiving a signal, a message, and data required to implement the above described present disclosure to and from the UE.

The standard content or standard documents mentioned in the above embodiments are omitted to simplify the description of the specifications and constitute a part of the specifications. Accordingly, addition of the standard content or some contents of the standard documents to the specifications or description thereof in the claims should be construed as the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed based on the accompanying claims in such a manner that all of the technical ideas included within the scope equivalent to the claims belong to the present disclosure.

What is claimed is:

1. A method of processing data by a user equipment (UE), the method comprising:
   receiving, by UE, wireless local area network (WLAN) radio resource configuration-dedicated information for setting data transmission and reception using a WLAN carrier, from an evolved Node B (eNB);
   setting, by the UE, a radio bearer group including one or more radio bearers to transmit and receive data through the WLAN carrier, based on the WLAN radio resource configuration-dedicated information; and
   transmitting and receiving, by the UE, the data of the radio bearer group to and from the eNB through the WLAN carrier,
   wherein the transmitting includes:
   separating, by a packet data convergence protocol (PDCP) entity in the UE, data to be transmitted to the eNB into i) first data to be transmitted through an eNB carrier and ii) second data to be transmitted through the WLAN carrier,
   wherein the WLAN radio resource configuration-dedicated information includes a WLAN identify (ID) and information for instructing a WLAN access authentication,
   wherein when a handover of the UE is determined, the eNB transmits WLAN measurement information and the WLAN radio resource configuration-dedicated information to a target eNB, and
   wherein the WLAN measurement information includes WLAN channel use rate information, backhaul bandwidth information, received signal strength indication information, WLAN ID, WLAN frequency band information, and WLAN frequency information.

2. The method of claim 1, wherein the WLAN radio resource configuration-dedicated information corresponds to information configured to be distinguished from radio resource configuration-dedicated information of a radio bearer transmitting and receiving data through the eNB carrier.

3. The method of claim 1, wherein the WLAN radio resource configuration-dedicated information is inserted into a handover preparation information message and transmitted to the target eNB with the handover preparation information message.

4. The method of claim 1, wherein the target eNB transmits, to the UE, information for instructing the radio bearer group of the UE to maintain a structure configured to transmit and receive the data through the WLAN carrier.

5. A method of processing data by an evolved Node B (eNB), the method comprising:
   generating, by the eNB, wireless local area network (WLAN) radio resource configuration-dedicated information for setting data transmission and reception using a WLAN carrier;
   transmitting, by the eNB, the WLAN radio resource configuration-dedicated information to a user equipment (UE); and
   transmitting and receiving, by the eNB, data of a radio bearer group including one or more radio bearers, to and from the UE, through the WLAN carrier,
   wherein the WLAN radio resource configuration-dedicated information includes information for setting the radio bearer group to transmit and receive the data through the WLAN carrier;
   wherein a packet data convergence protocol (PDCP) entity in the UE is configured to separate data to be transmitted to the eNB into i) first data to be transmitted through an eNB carrier and ii) second data to be transmitted through the WLAN carrier; and
   wherein the receiving includes:
   combining, by a PDCP entity in the eNB, the first data received through the eNB carrier and the second data received through the WLAN carrier, wherein the WLAN radio resource configuration-dedicated information includes a WLAN identity (ID) and information for instructing a WLAN access authentication, wherein the method further comprises determining a handover of the UE, wherein when the handover of the UE is determined, WLAN measurement information and the WLAN radio resource configuration-dedicated information are transmitted to a target eNB, and wherein the WLAN measurement information includes WLAN channel use rate information, backhaul bandwidth information, received signal strength indication information, WLAN ID, WLAN frequency band information, and WLAN frequency information.

6. The method of claim 5, wherein the WLAN radio resource configuration-dedicated information corresponds to information configured to be distinguished from radio resource configuration-dedicated information of a radio bearer transmitting and receiving data through the eNB carrier.

7. The method of claim 5, wherein the WLAN radio resource configuration-dedicated information is inserted into a handover preparation information message and transmitted to the target eNB with the handover preparation information message.

8. The method of claim 5, wherein the target eNB transmits, to the UE, information for instructing the radio bearer group of the UE to maintain a structure configured to transmit and receive the data through the WLAN carrier.

9. A user equipment (UE) for processing data, the UE comprising:
- a receiver configured to receive wireless local area network (WLAN) radio resource configuration-dedicated information for setting data transmission and reception using a WLAN carrier, from an evolved Node B (eNB);
- a controller configured to set a radio bearer group including one or more radio bearers to transmit and receive data through the WLAN carrier, based on the WLAN radio resource configuration-dedicated information; and
- a transmitter configured to transmit the data of the radio bearer group to the eNB through the WLAN carrier, wherein a packet data convergence protocol (PDCP) entity in the UE is configured to separate data to be transmitted to the eNB into i) first data to be transmitted through an eNB carrier and ii) second data to be transmitted through the WLAN carrier, wherein the WLAN radio resource configuration-dedicated information includes at least one of a WLAN identity (ID) and information for instructing a WLAN access authentication, and wherein, when a handover of the UE is determined, the eNB transmits WLAN measurement information and the WLAN radio resource configuration-dedicated information to a target eNB, and wherein the WLAN measurement information includes WLAN channel use rate information, backhaul bandwidth information, received signal strength indication information, WLAN ID, WLAN frequency band information, and WLAN frequency information.

10. The UE of claim 9, wherein the WLAN radio resource configuration-dedicated information corresponds to information configured to be distinguished from radio resource configuration-dedicated information of a radio bearer transmitting and receiving data through the eNB carrier.

11. The UE of claim 9, wherein the WLAN radio resource configuration-dedicated information is inserted into a handover preparation information message and transmitted to the target eNB with the handover preparation information message.

12. The UE of claim 9, wherein the target eNB transmits, to the UE, information for instructing the radio bearer group of the UE to maintain a structure configured to transmit and receive the data through the WLAN carrier.

* * * * *